(12) United States Patent
Kasahara et al.

(10) Patent No.: US 8,250,548 B2
(45) Date of Patent: Aug. 21, 2012

(54) METHOD FOR CONTROLLING HETEROGENEOUS MULTIPROCESSOR AND MULTIGRAIN PARALLELIZING COMPILER

(75) Inventors: Hironori Kasahara, Shinjuku-ku (JP); Keiji Kimura, Shinjuku-ku (KR); Jun Shirako, Shinjuku-ku (JP); Yasutaka Wada, Shinjuku-ku (JP); Masaki Ito, Machida (JP); Hiroaki Shikano, Kokubunji (JP)

(73) Assignee: Waseda University, Tokyo (JP)

( * ) Notice: Subject to any disclaimer, the term of this patent is extended or adjusted under 35 U.S.C. 154(b) by 1520 days.

(21) Appl. No.: 11/656,531

(22) Filed: Jan. 23, 2007

(65) Prior Publication Data
US 2007/0283358 A1 Dec. 6, 2007

(30) Foreign Application Priority Data
Jun. 6, 2006 (JP) .................................. 2006-157301

(51) Int. Cl.
*G06F 9/45* (2006.01)
(52) U.S. Cl. ...................................................... 717/149
(58) Field of Classification Search .................... 717/149
See application file for complete search history.

(56) References Cited

U.S. PATENT DOCUMENTS

| 7,464,379 B2 * | 12/2008 | Kanai et al. | 718/100 |
| 2007/0150907 A1 * | 6/2007 | Lee et al. | 719/330 |
| 2007/0245097 A1 * | 10/2007 | Gschwind et al. | 711/154 |

FOREIGN PATENT DOCUMENTS

| JP | 03-042765 | 2/1991 |
| JP | 11-102349 | 4/1999 |
| JP | 2001-175619 | 12/1999 |
| JP | 2001175619 A * | 6/2001 |
| JP | 2004-171234 | 11/2002 |
| JP | 2004-252728 | 2/2003 |
| JP | 2004-252900 | 2/2003 |

OTHER PUBLICATIONS

English translation of foreign patent application JP2001175619A.*
Yasutaka Wada et al., "A Static Scheduling Scheme for Coarse Grain Tasks on a Heterogeneous Chip Multi Processor", IPSJ SIG Technical Report, Jan. 24, 2006, pp. 13-19.
Hiroki Honda, et al., "Coarse Grain Parallel Execution Scheme of a Fortran Program on OSCAR", Transactions of Information Processing Society of Japan, Information Processing Society of Japan, Aug. 25, 1992, Vo. J75-D-I, No. 8, pp. 526-535 (Domestic Society Transactions 1999-01068-004) Abstract.
Office Action issued May 10, 2011 by the Japanese Patent Office in the corresponding Japanese Patent Application No. 2006-157301 (3 pages).

* cited by examiner

*Primary Examiner* — Li Zhen
*Assistant Examiner* — Bradford Wheaton
(74) *Attorney, Agent, or Firm* — Stites & Harbison, PLLC; Juan Carlos A. Marquez, Esq

(57) ABSTRACT

A heterogeneous multiprocessor system including a plurality of processor elements having mutually different instruction sets and structures avoids a specific processor element from being short of resources to improve throughput. An executable task is extracted based on a preset depending relationship between a plurality of tasks, and the plurality of first processors are allocated to a general-purpose processor group based on a depending relationship among the extracted tasks. A second processor is allocated to an accelerator group, a task to be allocated is determined from the extracted tasks based on a priority value for each of tasks, and an execution cost of executing the determined task by the first processor is compared with an execution cost of executing the task by the second processor. The task is allocated to one of the general-purpose processor group and the accelerator group that is judged to be lower as a result of the cost comparison.

20 Claims, 19 Drawing Sheets

METHOD FOR CONTROLLING HETEROGENEOUS MULTIPROCESSOR AND MULTIGRAIN PARALLELIZING COMPILER

CLAIM OF PRIORITY

The present application claims priority from Japanese application P2006-157301 filed on Jun. 6, 2006, the content of which is hereby incorporated by reference into this application.

BACKGROUND OF THE INVENTION

This invention relates to a method of controlling a heterogeneous multiprocessor system containing a plurality of different sorts of processor units, which enables efficient operation of the plurality of processor units, and to a compiler for producing a program.

Due to production of finer semiconductor elements along with progress in semiconductor manufacturing techniques, a large number of transistors can be integrated. At the same time, operation frequencies of processors are increased. However, since power during operation of the processors is increased and power in waiting statuses is increased due to a leakage current, further improvement in performance may not be expected, which has been achieved through improvements of logical systems and operating frequencies in conventional processors.

Thus, at present, as means for realizing improvement in performance and low power consumption, multiprocessor systems (single chip multiprocessor systems) are expected, in which a plurality of processor elements (hereinafter, referred to as "PEs") as conventional CPUs and DSPs are mounted on a single chip to perform processing in parallel, whereby high calculation performance can be obtained even without increasing the operating frequencies. Among those multiprocessor systems, a multiprocessor system which is composed of a plurality of processor elements whose structures and calculation performance are identical to each other, and which are executed by the same instruction set is a homogeneous multiprocessor system. A multiprocessor system which is composed of a plurality of processor elements having different structures and instruction sets is a heterogeneous multiprocessor system.

Homogeneous multiprocessor systems capable of improving process performance by promoting parallel processings are known (refer to, for example, JP 2004-252728 A or JP 2001-175619 A).

In the homogeneous multiprocessor systems, research of automatic parallelizing compilers has already been commenced, in which input programs are analyzed, parallel-operable program portions are extracted from the analyzed input programs, and the program portions are allocated to a plurality of PEs, whereby the program portions can be executed at the same time. For instance, JP 2004-252728 A discloses a compile system for producing an object program with which a multiprocessor system can be operated in a higher efficiency, by analyzing an input source program, dividing the program into various grains of blocks (tasks) such as subroutines and loops, analyzing parallelism among a plurality of tasks, dividing the tasks and data to be accessed by those tasks into sizes which can be fitted to a cache memory or a local memory, and optimally allocating those divided tasks to the respective PEs. Also, JP 2001-175619 A discloses an architecture of a chip multiprocessor for supporting a function of a multigrain parallel processing.

On the other hand, in the heterogeneous multiprocessor systems, general-purpose CPUs capable of executing various tasks are combined with PEs such as DSPs which execute specific processings at a high speed. Among those heterogeneous multiprocessor systems, such multiprocessor systems capable of optimizing processings are disclosed in, for example, JP 2004-171234 A and JP 2004-252900 A.

JP 2004-171234 A discloses the following technique. That is, tasks are temporarily allocated to processors whose instruction sets are different from each other, a judgement is made on whether or not allocation is to be changed to the processors of the different instruction set when the task is executed, and in a case where execution efficiency can be increased if the allocation is changed, the allocation change is performed.

Also, JP 2004-252900 A discloses the following technique. That is, tasks divided from a source program are allocated to the respective processors based on power consumption. Further, the tasks are preferentially allocated to a processor which can execute only few sorts of tasks than a core capable of executing various sorts of tasks.

SUMMARY OF THE INVENTION

In a heterogeneous multiprocessor system, since structures and characteristics of respective PEs are different from each other, heterogeneous PEs must be scheduled according to a characteristic of a program. As a result, if the technology of the homogeneous multiprocessor system disclosed in JP 2004-252728 A or JP 2001-175619 A is directly applied, the parallelized tasks are grouped in a hierarchical manner, so PEs are short of resources. For instance, in a heterogeneous multiprocessor system composed of one specific-purpose PE, when this specific-purpose PE is grouped to a certain general-purpose PE, the tasks cannot be scheduled with respect to this PE in other general-purpose core groups and other hierarchical layers. In other words, the tasks cannot be parallelized effectively, so the performance of this system cannot be conducted.

As a result, in order to utilize the heterogeneous multiprocessor system, as in a case of JP 2004-252728 A or JP 2001-175619 A, such a scheduling processing is required while paying attention to heterogeneous PEs.

However, in JP 2004-171234 A, after the tasks have been provisionally allocated to the respective PEs, the change of the allocation is judged when the task is executed. As a result, the cost (overhead) required for the scheduling process is increased, so the entire execution efficiency of the processors may be lowered. In particular, in the heterogeneous multiprocessor system arranged by combining the general-purpose processors with the accelerators (heterogeneous PEs) such as DSP and DRP, if the quantity and sort of the accelerators are increased, then the cost required for the scheduling process is increased. Accordingly, there is such a problem that the process speed of the entire processor is lowered due to the overhead for the scheduling process.

Also, in JP 2004-252900 A, since the tasks are allocated in a higher priority to a PE whose executable task sort is smaller, in the heterogeneous multiprocessor system arranged by combining the general-purpose processors with the accelerators such as DSP, the tasks are concentrated on the accelerator whose executable task sort is smaller, and on the other hand, the utilization efficiency of these general-purpose processors is lowered. As a result, there are some possibilities that specific PEs are short of resources, which may lower throughput of the entire processor.

This invention therefore has an object to provide a heterogeneous multiprocessor system including a plurality of processor elements whose instruction sets and structures are different from each other, which prevents a specific PE from being short of resources to improve throughput of the entire heterogeneous multiprocessor system.

This invention provides a control method for allocating a task to the heterogeneous multiprocessor system including: a plurality of first processors each for executing a first instruction set; and at least one second processor for executing a second instruction set which is different from the first processor, the control method including: extracting an executable task based on a preset depending relationship between a plurality of tasks; allocating the plurality of first processors to a general-purpose processor group based on the depending relationship between the extracted tasks; allocating the second processor to an accelerator group; determining a task to be allocated from the extracted tasks based on a preset priority value for each of the tasks; comparing an execution cost of executing the determined task by the first processor with an execution cost of executing the task by the second processor; and allocating the task to one of the general-purpose processor group and the accelerator group that is judged to be lower in the execution cost as a result of the cost comparison.

As a consequence, according to this invention, in the heterogeneous multiprocessor system in which the processors whose instruction sets are different from each other are accumulated, it is possible to avoid that the tasks are concentrated on the accelerator group, so the heterogeneous processors can be operated in a higher efficiency. When the task allocation is controlled during the task execution, the task is allocated to any one of the general-purpose processor group and the accelerator group according to the execution cost. As a result, an overhead required for allocation can be suppressed, as compared with the above-mentioned conventional examples. As a result, the processing of the heterogeneous multiprocessor system can be carried out at a higher speed.

DETAILED DESCRIPTION OF THE PREFERRED EMBODIMENTS

Figure 1:
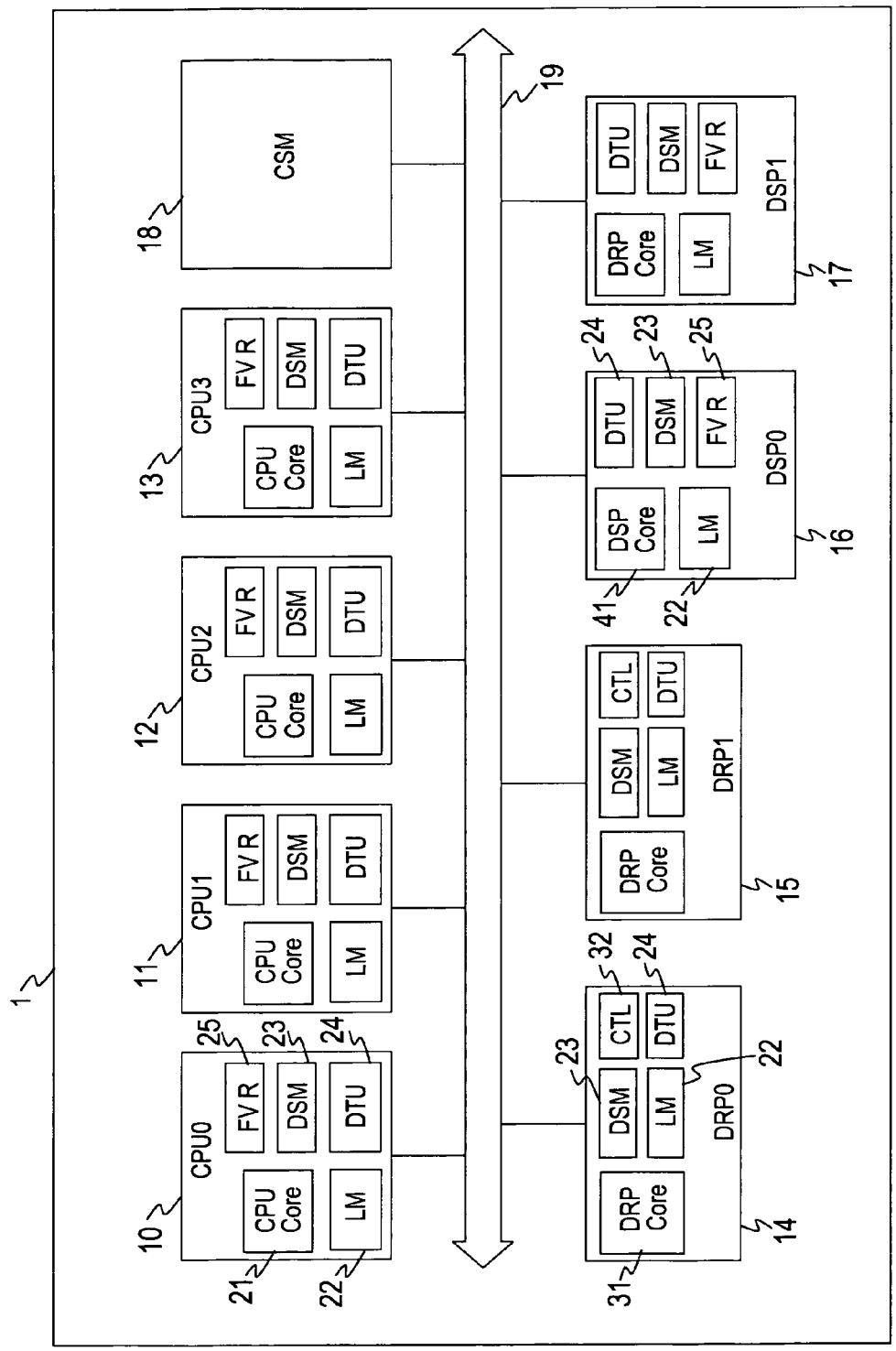
FIG. 1 is a block diagram for showing a multiprocessor system according to a first embodiment of this invention.

Referring now to the drawings, embodiments of this invention will be described.

(Entire Arrangement of First Embodiment)

FIG. 1 schematically shows an arrangement of a multiprocessor system according to a first embodiment of this invention. In FIG. 1, a heterogeneous multiprocessor system 1 is mainly composed of processor elements (hereinafter, referred to as "PE") 10 to 17 whose instruction sets and configurations are different from each other; a centralized shared memory (hereinafter, referred to as "CSM") 18 which is shared by these PEs 10 to 17; and an internal network 19 which connects the respective PEs 10 to 17 to the CSM 18. It should be noted that the internal network 19 may be alternatively arranged by employing a shared bus, a cross bus, or the like.

The respective PEs 10 to 17 and the CSM 18 are connected via respective interfaces (not shown) to the internal network 19.

As to a sort and a total number of these PEs, the first embodiment shows an example where the heterogeneous multiprocessor system 1 is composed of four general-purpose processing processors (hereinafter, referred to as "CPU") 10 to 13; and two dynamically reconfigurable processors (hereinafter, referred to as "DRP") 14 and 15; and two digital signal processors (hereinafter, referred to as "DSP") 16 and 17. It should be noted that the above-mentioned sort and total number of PEs are not limited only to those shown in the first embodiment, and various configurations may be employed.

Also, in the first embodiment, the DRPs (0, 1) 14 and 15, and the DSPs (0, 1) 16 and 17 are defined as specific-purpose processor elements (specific-purpose PEs), whereas the CPUs (0, 1, 2, 3) 10 to 13 are defined as general-purpose processor elements (general-purpose PEs). The DRPs 14 and 15 refers to such processors that processing circuits are dynamically configurable, and circuits can be virtually changed within a limited core.

In the first embodiment, the DRPs 14 and 15 and the DSPs 16 and 17 of the specific-purpose PEs use different instruction sets from those of the CPUs 10 to 13 of the general-purpose PEs. The specific-purpose PEs are arranged such that only processings for a previously set task (unit block of a processing) can be executed, and function as accelerators. On the other hand, the CPUs 10 to 13 of the general-purpose PEs can execute the processings of the DRPs 14 and 15 and the DSPs 16 and 17 of the specific-purpose PEs in addition to commands to the respective specific-purpose PEs and general-purpose calculating processings. It should be noted that processing speeds in the case where the CPUs 10 to 13 execute processings of the specific-purpose PEs are lower than processing speeds of the DRPs 14 and 15 and the DSPs 16 and 17. In other words, the specific-purpose PEs function as accelerators of the general-purpose PEs with respect to the specific tasks.

The CPU10 of the general-purpose PE includes: a CPU core 21 which executes a calculating processing; a local memory (LM) 22; a distributed shared memory (DSM) 23 which is shared among the respective PEs 10 to 17; a data transfer unit (hereinafter, referred to as "DTU") 24; and a system control register (FVR) 25. The LM 22 temporarily stores a program and data processed by the CPU10. The DTU 24 performs a data transfer operation between the CSM 18 and other PEs 11 to 17. The system control register (FVR) 25 performs a frequency/power supply voltage (FIV) control operation for determining a supply voltage and an operating frequency with respect to the CPU10, and a synchronizing control operation among the PEs. It should be noted that other CPUs 11 to 13 similarly include the same structural elements as those of the above-mentioned CPU10. Further, it should be noted that a system control register FVR drives each of the PEs in such a manner that, for instance, when a set value is "0", the power supply is turned OFF; when the set value is "11", a low driving frequency and a low voltage are selected with respect to the CPU10; when the set value is "3", a maximum driving frequency and a maximum voltage are selected; and when the set value is "2", an intermediate driving frequency and an intermediate voltage are selected.

Also, the DTU 24 is arranged by containing a direct memory access controller (DMAC). The DTU 24 performs data transfer operations among the LM 22, the DSM 23, and the CSM 18, or among other DSMs 23 of the general-purpose PEs and the specific-purpose PEs in the background of the CPU core 21.

The DRP 14 includes a DRP core 31 which is dynamically configurable, a control unit (CTL) 32, an LM 22, a DSM 23, and a data transfer unit (DTU) 24. The control unit 32 controls the configuration of the DRP core 31, and also controls operation conditions thereof. The LM 22 temporarily stores a program and data processed in the DRP 14. The DSM 23 is commonly used between the respective PEs. The data transfer unit 24 performs a data transfer operation between the CSM 18 or other PEs 10 to 13 and 15 to 17. It should be noted that the control unit 32 performs a frequency/power supply voltage (FV) control operation for determining a supply voltage and an operating frequency of the DRP 14, and a synchronizing control operation among the PEs. It should be noted that the configuration of the DRP (1) 15 is identical to that of the DRP 14.

The DSP 16 includes a DSP core 41 which executes a specific signal processing, the LM 22, the DSM 23, the DTU 24, and the system control register (FVR) 25. The LM 22 temporarily stores a program and data processed in the DSP 16. The DSM 23 is commonly used between the respective PEs 10 to 17. The DTU 24 performs a data transfer operation between the CSM 18 or other PEs 10 to 15 and 17. The system control register (FVR) 25 performs a frequency/power supply voltage (FV) control operation for determining a supply voltage and an operating frequency of the DSP 16, and a synchronizing control operation among the PEs. Also, the DSP (1) 17 is provided with the same structural elements as those of the above-mentioned DSP 16.

Further, it should be noted that a global address is mapped to the DSM 23 of each of the PEs 10 to 17, with which access can be made from other PEs. On the other hand, a local address is mapped to the LM 22, with which access can be made within the own PE.

The above-mentioned configuration is merely an example of the arrangements applicable to this invention, and therefore, as embodiments of this invention, other arrangements may be employed. For example, although not shown in FIG. 1, peripheral circuits such as an input/output processing circuit, an interrupt processing circuit, a timer, and a debugging circuit are connected to the internal network 19 if necessary.

It should be noted that a case where the PEs 10 to 17 are arranged on one chip (LSI) is described. However, a plurality of LSIs which constitute the PEs 10 to 17 may be coupled to each other to be constructed as a single chip or a single module.

Figure 19:
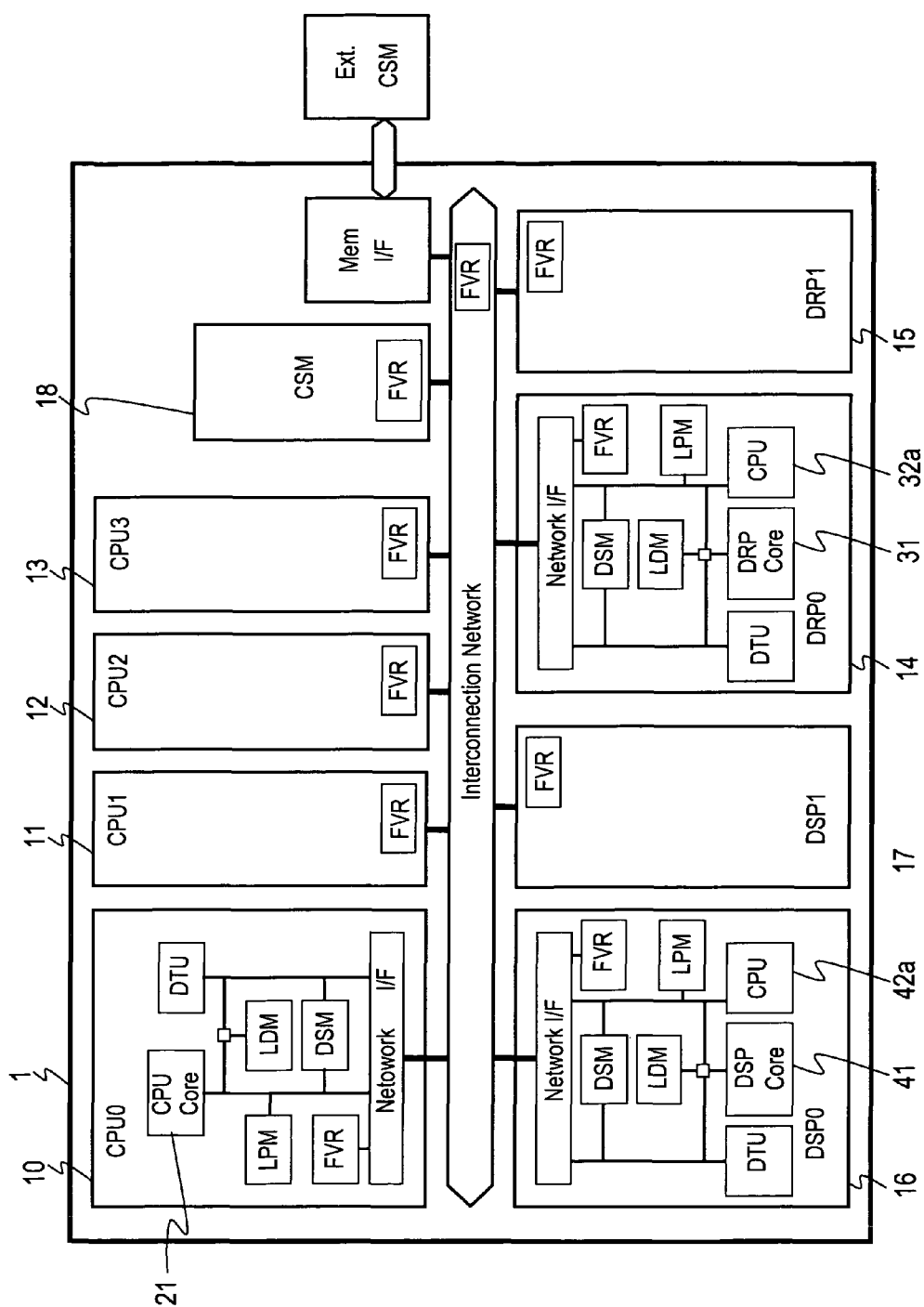
FIG. 19 is a block diagram for showing another example of a multiprocessor system.

For instance, FIG. 19 shows a structural example of an architecture which contains connections of the respective elements provided in a processor core. In this example, in addition to four CPUs (CPU0 to CPU3) as the general-purpose PEs, two DSPs (DSP0 and DSP1), and two DRPs (DRP0 and DRP1) are mounted as the specific-purpose PEs.

In the specific-purpose PEs, an accelerator core (corresponding to DSP core and DRP core in this drawing) capable of processing a specific calculation at a high speed is mounted, and further, controller CPUs 32a and 42a are respectively mounted. These controller CPUs 32a and 42a perform control of the accelerator cores, synchronous communication, and a data transfer operation required to execute a processing in the accelerator.

As to the above-mentioned CPU 32a and CPU 42a, a control-purpose CPU in which an instruction set is simplified may be employed for the purpose of controlling a specific-purpose PE. However, by employing a CPU core having a high function similar to that of a general-purpose PE, a different calculating processing may be carried out in parallel with a processing executed in the accelerator core.

Also, similarly to a general-purpose CPU core, a specific-purpose PE has a local data memory LDM which temporarily stores processed data; a local program memory LPM which stores a program executed on a controller CPU or an accelerator core; and a distributed shared memory DSM which stores data which are shared among processors. Further, similarly to the general-purpose PE, the specific-purpose PE has a data transfer unit DTU, for enabling data transfer between these sorts of memories and memories of other PEs or the shared memory CSM. It should be noted that these sorts of memories are connected with an external bus, the accelerator core, the controller CPU, and the data transfer unit DTU via a PE internal bus. Also, the local program memory LPM may be realized as a prefetchable cache memory.

(Concept on Multigrain Parallel Processing)

Next, a description is made of a parallel processing of a task executed in the heterogeneous multiprocessor system 1 shown in FIG. 1. A task (program) which is executed in each of the PEs is produced from a macro task graph obtained by analyzing an input program by a compiler to be described later. That is to say, as to the input program, since a configuration of this input program is first analyzed by using the compiler described later, a statement block whose grain size is large, such as a basic block (BB) made of only an assignment statement, a repetition block (RB), and a sub-routine (SB), is divided as macro tasks (MTs). Also, a processing within a macro task constitutes a task.

Figure 2:
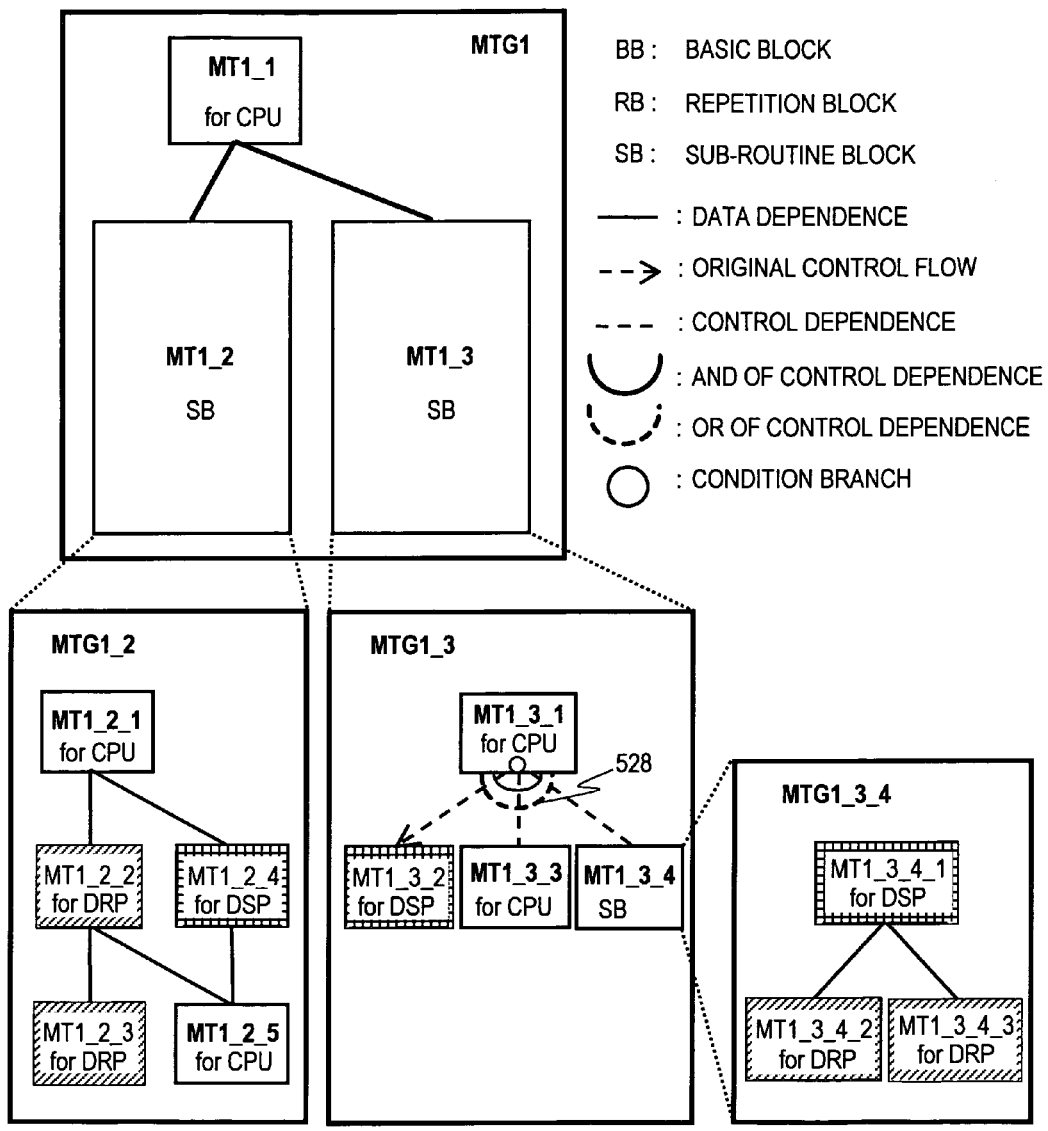
FIG. 2 is a macro task graph for showing a depending relationship among tasks produced by a compiler according to the first embodiment of this invention.

For instance, FIG. 2 is a macro task graph for showing a result obtained by analyzing an input program by the compiler. In the example of FIG. 2, if such a graph obtained by analyzing an input program as described later corresponds to a macro task graph "MTG1", it is so assumed that this input program is divided into three macro tasks "MT1_1" to "MT1_3." In this example, a macro task corresponds to such a task obtained by dividing the input program (source code) into a unit block of a plurality of grains. In other words, by dividing into macro tasks, a multigrain parallel processing is performed in which parallel processings are carried out by combining a macro data flow processing, a medium grain size parallel processing, and a near fine grain size parallel processing in a hierarchical manner. The macro data flow processing utilizes a parallel processing among tasks having coarse grains, such as a sub-routine. The medium grain size parallel processing corresponds to a parallel processing of loop levels. The near fine grain size parallel processing utilizes a parallelism of statement levels within a basic block. It should be noted that as to the coarse grain task parallel processing of the multigrain parallel processing in which the parallelism of the processings is extracted from the structural elements (grains) of the input program and the extracted parallelism is grouped to the macro tasks, the method proposed in JP 2004-252728 A by the inventors of this invention or other known methods can be employed.

In this example of FIG. 2, a case where the input program is decomposed into 3 macro tasks by the compiler to be described later, and a depending characteristic of a parallel execution is present in two macro tasks MT1_2 and MT1_3 among the plurality of macro tasks. In this case, a depending characteristic of a parallel execution functions as an index for determining whether or not respective tasks can be executed in parallel based on a depending characteristic of data between macro tasks or between tasks, or a depending characteristic of a control operation. For instance, as indicated by a solid line of FIG. 2, when a depending characteristic of data is present such that if an upper-grade macro task is not accomplished, a lower-grade macro task cannot be executed, there is no depending characteristic of the parallel execution. In other words, FIG. 2 indicates that if the macro task MT1_1 is not accomplished, the macro tasks MT1_2 and MT1_3 cannot be executed.

On the other hand, after the macro task MT1_1 is accomplished, the depending characteristic of the data is not present between the macro task MT1_2 and the macro task MT1_3, so the respective macro tasks can be independently executed in parallel. As previously described, such a status where macro tasks or tasks can be executed in parallel is judged as having the depending characteristic of the parallel execution.

Further, when an internal portion of the macro task MT1_2 is analyzed, the compiler decomposes the macro task MT1_2 into five tasks MT1_2_1 to MT1_2_5. Analysis of depending characteristics of the parallel executions of the divided tasks MT1_2_1 to 1_2_5 indicates that after the task MT1_2_1 is accomplished, the task MT1_2_2 and the task MT1_2_4 can be executed in parallel; after the task MT1_2_2 is accomplished, the task MT1_2_3 can be executed; and after both the task MT1_2_2 and the task MT1_2_4 are accomplished, the task MT1_2_5 can be executed.

In this macro task MT1_2, there is no uncertain element when condition branches are executed from an upper-grade hierarchical layer to a lower-grade hierarchical layer, so static scheduling for statically allocating tasks is applied as will be described later.

On the other hand, in the macro task graph MTG1_3, the compiler divides the macro task MT1_3 into four tasks MT1_3_1 to MT1_3_4. Then, a condition branch is produced based on an execution result of the task MT1_3_1, which causes a control dependence for executing either the task MT1_3_2 or both the tasks MT1_3_3 and MT1_3_4. In this drawing, a broken line having no arrow is extended to the task MT1_3_4, and an arc 528 of a solid line which indicates an AND condition of the control dependence is overlapped on this broken line having no arrow extended to the task MT1_3_4 and a broken line connected to the task MT1_3_3. This status indicates that if the task is branched in the direction of the task MT1_3_3 pointed by the arrow under the above-mentioned condition, the task MT1_3_4 which control-depends on the same branch can be executed at the same time. It should be noted that the broken line in the drawing represents a control depending relationship in which the execution of the task is fixed, and a condition of a case where a task which depends on data is not executed. Also, a broken line having an arrow indicates that the control flow is identical to a control flow (namely, original) which is obtained in a data depending/control flow analysis (402).

Further, since the task MT1_3_4 is a sub-routine block (SB), analysis of an internal portion of this sub-routine block indicates that the task MT1_3_4 is decomposed into three tasks MT1_3_4_1 to MT1_3_4_3, and after the task MT1_3_4_1 is accomplished, the task MT1_3_4_2 and the task MT1_3_4_3 can be executed in parallel. In this case, since the condition branch is carried out based on a result of the task MT1_3_1, a processing subsequent to the task MT1_3_1 contains uncertain elements during execution, because the branching destination is not determined at the time of compiling. In this case, since it is desirable to determine a PE during execution, dynamic scheduling to be described later is applied to a lower-grade hierarchical layer of the task MT1_3_1 produced by the compiler.

Also, the compiler allocates the respective tasks MTs to the group of the respective PEs by automatically detecting the compiler or a description of a PE to be used, which is described in the input program.

Here, as a feature of this invention, when tasks are allocated to the respective PEs, these tasks are allocated for each of processor groups to be described later. Then, scheduling is carried out in such a manner that each of the tasks is accomplished in the shortest time. At this time, in specific tasks which can be executed by the DRPs 14 and 15 and the DSPs 16 and 17 of the specific-purpose PEs, the tasks are basically allocated for each of the groups of the specific-purpose PEs. However, when all of the specific tasks are allocated to the specific-purpose PEs, there are some cases where a process completion waiting status is caused in the specific-purpose PE, whereas, a task waiting status is caused in the general-purpose PE. In a case where the specific-purpose PEs are short of resources, the tasks to be allocated to the specific-purpose PEs are allocated to the general-purpose PE groups, and scheduling is carried out in such a manner that the entire processing speed of the heterogeneous multiprocessor system is increased. As to this scheduling, as will be described later, there are two cases where static scheduling set in the compiler is carried out, and where dynamic scheduling embedded between tasks is carried out.

(Grouping of Processors)

Next, referring to FIGS. 2 and 3, a description will be made of grouping of processors according to this invention. In this invention, when the compiler allocates tasks to PEs, the compiler does not allocate the tasks to individual PEs, but allocates the tasks in a group unit of the PEs.

Groups of the PEs are mainly separated into two groups, namely, a general-purpose processor group (general-purpose PG) which is composed of general-purpose PEs, and an accelerator group which is composed of specific-purpose PEs. In the following specification, the CPUs 10 to 13 are indicated by CPU0 to CPU3, respectively, which correspond to identifiers among the CPUs. Also, in the accelerator group, the DRPs 14 and 15 are indicated by DRP0 and DRP1, respectively, which correspond to identifiers between the DRPs, whereas the DSPs 16 and 17 are indicated by DSP0 and DSP1, respectively, which correspond to identifiers between the DSPs.

In the general-purpose processor group PG, CPUs are virtually grouped according to parallelism and a hierarchical structure of a program (macro task MT). For example, in FIG. 3, four general-purpose processors can be utilized ("4PEs" in FIG. 3) for the entire program. A first hierarchical layer is equal to, for example, the uppermost macro task graph MTG1 of the macro task graph shown in FIG. 2. Taking the parallelism and the like within this macro task graph MTG1 into consideration, two CPUs among the four CPUs are grouped to form a single group as a general-purpose processor group PG1-0, whereas the remaining two CPUs are grouped to form a single processor group as another general-purpose processor group PG1-1, which constitute a unit used to allocate the macro tasks within the macro task graph MTG1.

In this example, it is so assumed that the macro task MT1_1 and the macro task MT1_2 (including the macro task graph MTG1_2) are allocated to the general-purpose processor group PG1-0, whereas the macro task MT1_3 (including the macro task graph MTG1_3) is allocated to the general-purpose processor group PG1-1.

Figure 3:
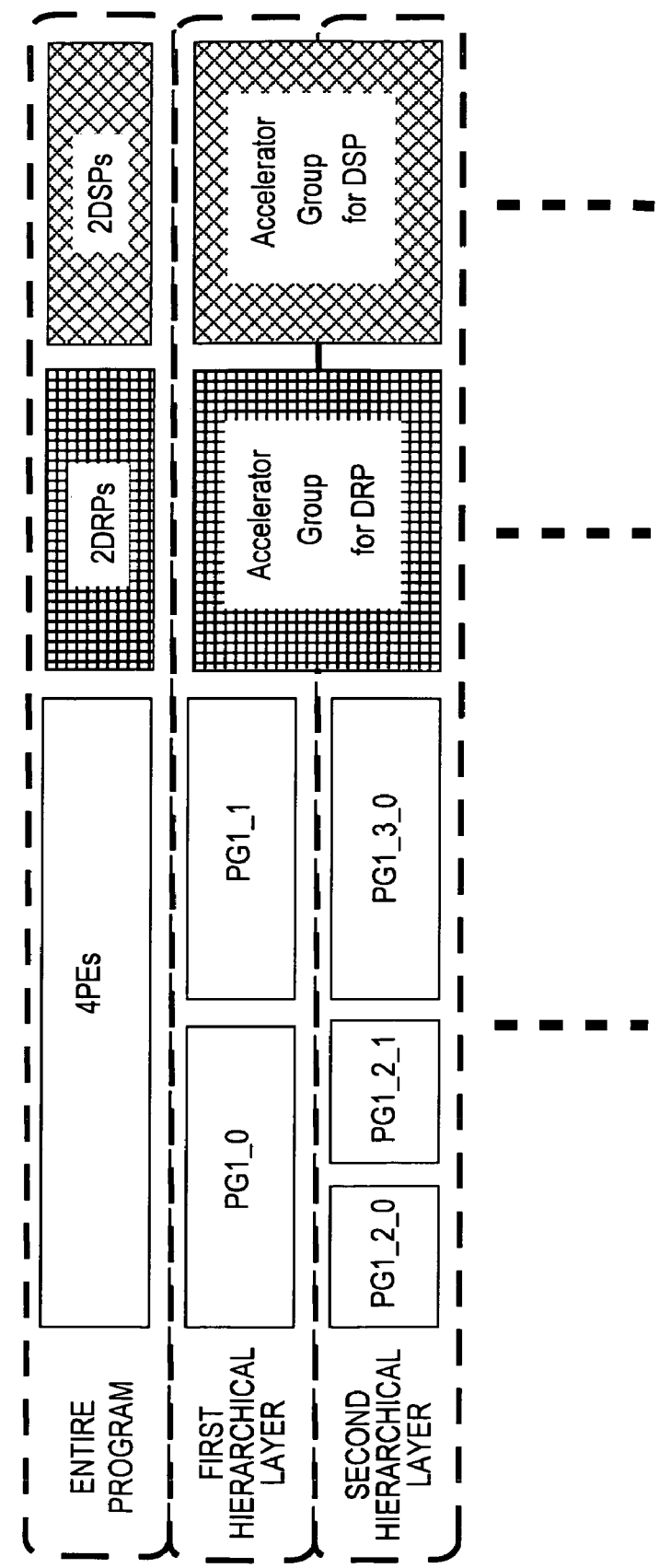
FIG. 3 is a block diagram for showing an example of grouping of processors according to the first embodiment of this invention.

A second hierarchical layer shown in FIG. 3 represents an example of grouping while the macro tasks MT1_2 and MT1_3 are executed in parallel after the macro task MT1_1 has been executed on the general-purpose processor group PG1-0. At this time, one CPU among the CPUs contained in the general-purpose processor group PG1-0 is grouped as a general-purpose processor group PG1-2-0, and the other CPU is grouped as a general-purpose processor group PG1-2-1, based on information of the macro task graph MTG1_2. Then, the respective macro tasks within the macro task graph MTG1_2 are allocated to the general-purpose processor group PG1-2-0 or PG1-2-1, or to accelerator groups according to sorts of macro tasks. Also, two CPUs contained in the general-purpose processor group PG1-1 are grouped as a general-purpose processor group PG1-3-0, whereas the respective macro tasks contained in the macro task graph MTG1_3 are allocated with respect to this general-purpose processor group or the accelerator groups, based on information of the macro task graph MTG1_3. In this second hierarchical layer, when such a macro task having a macro task graph inside thereof in the task MT1_3_4 of FIG. 2 is allocated, while this macro task is executed, grouping of processors equal to or lower than a third hierarchical layer is employed according to the internal configuration. Also, if the macro task graph MTG1 contains macro tasks other than the macro tasks MT1_2 and MT1_3 and has a macro task graph, or if the processor group to which the macro tasks are allocated by scheduling is different from the above-mentioned processor group, grouping of the processors is determined according to the information of the macro task graph of the general-purpose processor. Therefore, in the hierarchical layers equal to or lower than the second hierarchical layer, grouping of general-purpose processors different from that shown in FIG. 3 is carried out according to the allocation/execution condition of the macro tasks. For example, in the case where the macro task MT1_2 is allocated to the general-purpose processor group PG1-1, the general-purpose processor groups PG1-2-0 and PG1-2-1 are grouped by employing the processors contained in the general-purpose processor group PG1-1.

As previously described, in the general-purpose processor group PG, grouping of the processors which are nested to each other in the hierarchical manner is carried out according to the hierarchical structure or the parallelism of the programs.

In contrast, in the accelerator group, grouping of the processors is performed in the unit of the sort of specific-purpose PE or the function thereof, which does not depend on the hierarchical structure or the parallelism of the programs. That is, as shown in FIG. 3, the DRP0 and the DRP1 are allocated to the accelerator group for the DRPs, whereas the DSP0 and the DSP1 are allocated to the accelerator group for the DSPs. In the accelerator group, tasks are allocated to each of the specific-purpose PEs in both the DRPs and the DSPs. Alternatively, in the accelerator group of the DRPs, grouping may be performed for each of the functions of DRPs whose configurations have been changed (for example, every configuration of the DRP core).

As previously described, in the heterogeneous multiprocessor system 1 of this invention, grouping of the PEs is carried out as follows. In the general-purpose processor group PG, the PEs are grouped in the hierarchical manner depending on the hierarchical structures and the parallelism of the programs (tasks), whereas in the accelerator group, the PEs are grouped in the sort unit or the function unit of the specific-purpose PEs without depending on the hierarchical structures and the parallelism of the programs.

Accordingly, populating of tasks from the general-purpose processor group PG to the accelerator group can be carried out from any of the hierarchical layers, so the utilizing efficiency of the specific-purpose PEs can be improved. In other words, although the specific-purpose PEs can be allocated to the general-purpose processor group PG, tasks which can be processed in the specific-purpose PEs are not always contained in the tasks which are allocated to the general-purpose processor group PG.

Thus, the grouping is carried out in the sort unit or the function unit of the specific-purpose PE in such a manner that while the specific-purpose PEs are not contained in the general-purpose processor group PG, the tasks can be accepted from any of the hierarchical layers of the general-purpose processor group PG. As a result, the utilization efficiencies as to the general-purpose PEs and the specific-purpose PEs can be improved, so the entire processing speed of the heterogeneous multiprocessor system 1 can be improved.

(Process Flow of Compiler)

Figure 4:
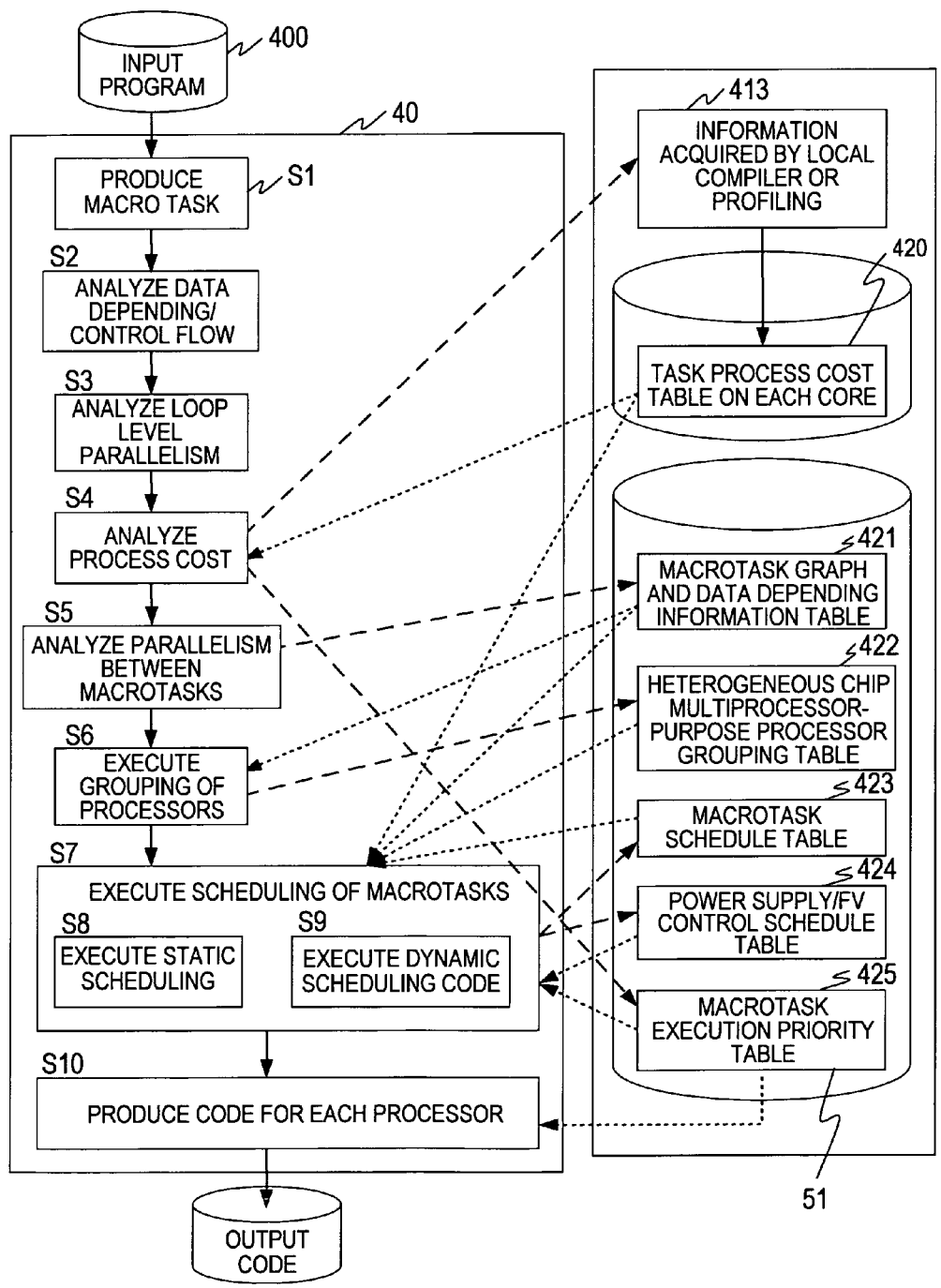
FIG. 4 is a flow chart for showing an example of processings executed by the compiler according to the first embodiment of this invention.

Next, a compiling method of producing a code for performing an optimizing control operation of scheduling in correspondence with a characteristic of a PE and a processing of a compiler mounted with the compiling method in the above-mentioned heterogeneous multiprocessor system 1 will be described sequentially. FIG. 4 shows an example of process flow operations of the compiler 40 in which this compiling method has been installed. This compiler 40 is executed on a computer 50. It should be noted that the computer 50 is equipped with an external storage apparatus 51 which stores respective tables to be described later.

(Production of Macro Task)

An input program 400 is a source of a sequential configuration which is described based on such a high level language as C language and Fortran. First, the compiler 40 analyzes a program configuration of the input program 400. In this analysis, the compiler 40 divides the input program 400 into large macro tasks (MTs) based on three sorts of grains so as to produce respective tasks (S1). The three sorts of grains include a repetition block (RB), a sub-routine (SB), and a block of pseudo assignment statements (BPA).

The repetition block RB corresponds to a loop located on the outermost side in each of the hierarchical layers in a loop block. The pseudo assignment statements block BPA is a block obtained by merging, or dividing a plurality of basic blocks made of assignment statements, taking into consideration scheduling overhead or parallelism.

In the above-mentioned a step S1, an allocation of processor groups (or PEs) can be previously described. For instance, it is possible to clearly designate that a certain sub-routine is allocated to a DSP group, or a certain sub-routine is allocated to the general-purpose processor group PG. As a result, as to this DSP sub-routine, parallelism thereof is further analyzed by the compiler 40. For example, in the case where there are two DSPs, the compiler 40 performs a parallelizing scheduling operation with respect to these two DSPs.

(Analysis of Data Dependence/Control Flow)

Subsequently, the compiler 40 analyzes a control flow among the tasks produced through division and depending characteristics of data so as to extract an execution sequence relationship of the macro tasks MTs (S2). Since the input program 400 has been described in the sequential manner, execution codes produced by the normal compiler 40 are executed sequentially as in the configuration of the program. However, in terms of the macro tasks MTs, there are many cases where the execution codes are not necessarily required to be executed in the described sequence.

In other words, in a case where there is no depending characteristic of control or data reference among the macro tasks MTs, especially in a multiprocessor system, it is important that a plurality of macro tasks MTs are arranged in a plurality of PEs and at the same time or, by changing the sequence are scheduled in such a manner that the entire execution time becomes short.

In order to perform such a scheduling operation, parallelism among the macro tasks MTs must be analyzed. Accordingly, as a preparation for this analysis, the execution sequential relationship among the macro tasks MTs is extracted by performing the data depending/control flow analyzing processing S2.

(Analysis of Loop Level Parallelism)

Subsequently, the compiler 40 parallelizes loop levels as a parallelism analysis of medium grain size levels within the macro task MT (S3). In the loop level parallelizing a step S3, the compiler 40 analyzes depending characteristics of data among repetition (iteration) unit of the loop so as to judge whether or not each of the iterations can be independently processed. When each of the iterations can be independently processed, the compiler 40 allocates the respective iterations to the plurality of PEs so as to perform a parallel processing.

Also, parallelizing of loops may be realized by various methods, for example, a single loop is divided into a plurality of loops to increase parallelism; copying data or expanding an array variable in order to delete depending characteristics of data among the respective loops; and merging a plurality of loops into a single loop to reduce an overhead required for a loop control.

(Analysis of Process Cost)

Next, the compiler 40 performs a process cost analysis (S4), in which a process cycle required when the thus-produced macro tasks MTs are executed by each of the PEs 10 to 17 is estimated. As a method of estimating a process cost (calculation cost=process time), for example, regarding the general-purpose processor group PG, while cycle numbers required in instruction levels of multiplication and addition are held in a task process cost table 420 as profiling information, a sequential process cycle number when the macro task MT is executed by this general-purpose processor group PG can be estimated by referring to the task process cost table 420. It should be noted that, as will be discussed later, a process cost may be calculated by adding a process time to a data transfer time for each of the processor elements PEs.

When it is difficult to estimate the number of cycles at an object-code level in such devices as the DRP or the DSP which handles multiple amount of data with one command, each local compiler generating an object code of the device is called by the compiler 40 and estimates execution cycles on the converted execution codes by the local compiler (413).

In this connection, in this invention, not all of the tasks MTs directed to the specific-purpose PEs are allocated to the accelerator group, and in a case where a process completion waiting status occurs in the accelerator group so that an end time instant is delayed, the task MT is allocated to the general-purpose processor group PG. As a result, regarding the cost analysis of the task MT of the specific-purpose PE, estimation is made based on both the code of the specific-purpose PE and the code of the general-purpose PE. When the profiling information is not employed during the estimation, the compiler 40 has not yet outputted the execution code at this stage, so the compiler 40 may produce an intermediate code, and then, may estimate the process cost based on this intermediate code. Also, when the process cost is estimated, detailed information (for example, where data is) is not yet determined. As a result, the process cost may be calculated assuming that necessary data and the like are present in the local memory LM 22 and the distributed shared memory DSM 23 of each of the PEs without including a transfer cost from the CSM 18 to the DSM 23.

Also, similarly to grouping of the above-mentioned processors, the tasks MTs of the specific-purpose PEs are not contained in the hierarchical layers of the tasks MTs of the general-purpose processor group PG. As a result, the tasks MTs of the specific-purpose PEs can be populated from the tasks MTs of the respective hierarchical layers.

It should be noted that while a local compiler for each of the specific-purpose PEs is previously set according to a sort of the specific-purpose PE, for example, if the specific-purpose PE is a DSP, local compiler profiling information of the DSP is employed, whereas if the specific-purpose PE is a DRP, local compiler profiling information of the DRP is employed.

Also, for example, in a case where a branch is contained, or a size of a loop or a size of an array are not determined before a task MT is executed, since profiling is performed once by a local compiler, a process cost can be calculated in higher precision. It should be noted that the profiling information of each of the local compilers is stored in a task process cost table 420 to be described later.

In the above-mentioned example, the process cost is defined as the process cycle number (time). Alternatively, by defining a cost as electric power, scheduling can be carried out in such a manner that the electric power becomes minimum. For example, such an operation mode that power consumption becomes minimum within a process time limit is selected from settable FV control modes (frequencies and system voltages) based on the process cycle number and the process time limit until which a task MT should be accomplished. Alternatively, power consumption of a processor element PE can be estimated as follows:

power consumption=system voltage (to the power of) 2×driving frequency.

Therefore, a combination of FV control modes in which power consumption becomes minimum within a process time limit may be selected to carry out scheduling.

In the process cost analyzing a step S4, based on the acquired process costs, as to the respective macro tasks MTs, the compiler 40 sets priority GCP (Global-Cost Priority) of the macro tasks MTs, respectively, in the entire processing, taking into consideration the hierarchical structures of the macro tasks MTs.

When priority GCP is set, a maximum critical path (CP) length of each of the macro tasks MTs is calculated, and the priority GCP is set according to the calculated maximum CP length. A maximum CP length indicates such a path that a process cost becomes longest in a macro task graph in which the task cannot advance to the a next task MT if an upper-grade task MT is not accomplished.

Figure 5:
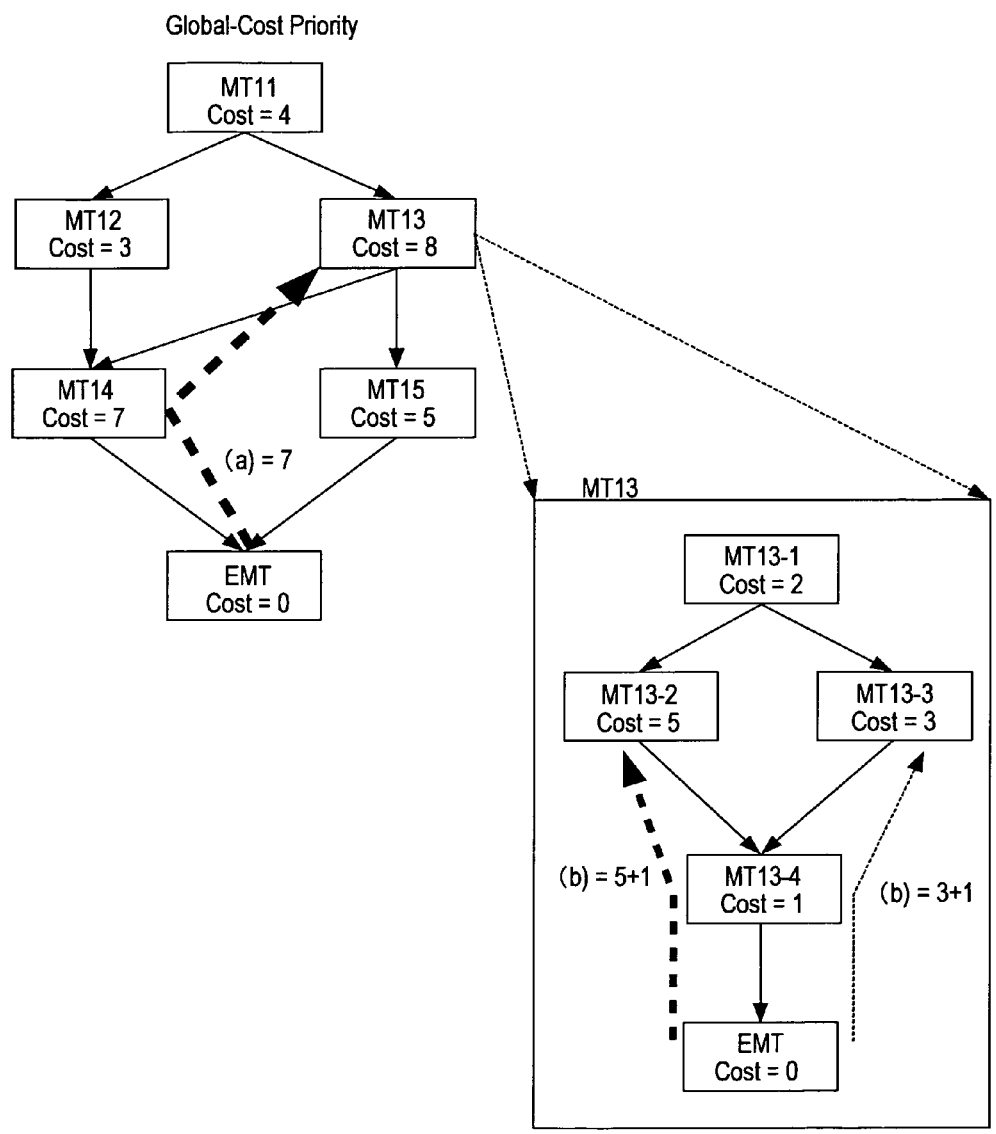
FIG. 5 is a macro task graph when a priority GCP is calculated according to the first embodiment of this invention.

A description is made on a case where, for instance, as represented in FIG. 5, priority GCPs are set for tasks MT13\_2 and 13\_3 which have parallelism within a macro task MT13 of macro tasks MT11 to EMT having two parallelisms.

First, a maximum CP length from the macro task EMT as an exit node of the macro task MT 11 to an exit of the macro task EMT13 is calculated as (a). Between the macro task EMT13 and the macro task EMT of the exit, a macro task MT14 having a process cost=7 and another macro task MT15 having a process cost=5 are present. As a consequence, the maximum CP length (a) up to the exit of the macro task EMT13 becomes equal to 7.

Next, with respect to the task MT13\_2 to which the priority GCP is to be set, a maximum CP length from a task EMT as an exit node of the macro task EMT13 to an entrance of a task MT13-2 is calculated as (b). Between the task MT13\_2 and the task EMT of the exit, a task MTG13\_4 having a process cost=1 is present, and a process cost of this task MT13\_2 is equal to 5. Thus, the maximum CP length of the task EMTG to the exit becomes equal to 6. Thus, the maximum CP length of the task MT13\_2 becomes equal to (a)+(b)=13. Then, the value of this maximum CP length is set to the task MT13\_2 as the priority GCP.

With respect to the task MT13\_3, when a maximum CP length thereof is similarly calculated, (a)=7 similarly, and (b)=4. As a consequence, the maximum CP length of the task MT13\_3 becomes equal to 11, so this maximum CP length becomes the priority GCP of the task MT13\_3.

In the following processing, a task MT which should be executed is determined based on the priority GCP. Accordingly, when the task MT13 is processed, in a case where the compiler 40 judges which one of the task MT13\_2 and the task MT13\_3 is to be preferentially processed, the compiler 40 processes the task MT13\_2 having larger priority GCP value preferentially.

In other words, the fact that the priority GCP is high implies that the process cost is high, and this implies that there are many tasks which should be processed within the macro task MT. As a consequence, in order to quickly process a certain macro task, a macro task MT with larger amount of tasks and data which should be processed is executed at a top priority, whereby the macro tasks MTs of the lower grade (lower layer) can be quickly processed.

That is to say, the fact that the priority GCP is high indicates that there are many tasks not only within the task, but also in subsequent tasks, or that the process cost is large. As a result, as to the tasks whose priority GCP values are high, by executing these tasks by allocating at an earlier stage in scheduling, the processings of the entire macro task can be carried out at a high speed.

The above-mentioned processing is carried out for each of the tasks while the maximum CP length is calculated as the priority GCP, and the calculated maximum CP length is stored in the macro task execution priority table 425.

(Analysis of Parallelism Among Macro Tasks or Analysis of Earliest Execution Condition)

After the compiler 40 determines the priority GCP of the macro tasks MTs, the compiler 40 determines parallelism among the macro tasks MTs, namely, a condition under which the respective macro tasks MTs may be executed earliest (earliest execution condition) based on the result of analysis of the control flow among the macro tasks MTs extracted in the data depending/control flow analyzing process 402, and the data depending characteristics at the same time (S5).

A macro task graph MTG visibly represents this earliest execution condition. FIG. 2 is an example of the macro task graph MTG produced by analyzing the input program 400. The analysis result as to the parallelism among the macro tasks is held in the external storage apparatus 51 of the computer 50 as a macro task graph/data depending information table 421, and is used in a compiling processing executed in a post stage.

As described in the previous index (concept of multigrain parallel processing), with reference to FIG. 2, the parallel sequence relationship of the macro task graph MTG1\_2 is fixed before execution, and thus, the tasks can be previously scheduled in a fixed (static) manner.

On the other hand, the macro task graph MTG1\_3 within the macro task MT1\_3 indicates that the condition branch is contained. As to the condition branch of the task MT1\_3\_1, if this task MT1\_3\_1 is not executed, the branch direction is not fixed. Accordingly, scheduling of tasks is required to be executed according to statuses during execution. In the case where this condition branch is fixed and the condition is branched to the task MT1\_3\_2 direction or the task MT1\_3\_3 direction, since the solid line indicates that the data depending relationship is present from the task MT1\_3\_1 to the task MT1\_3\_4, at the time instant when the executions of both the tasks MT1\_3\_3 and MT1\_3\_4 are accomplished, the macro task MT1\_3 is completed.

(Processor Grouping)

Next, the compiler 40 refers to the produced macro task graph/data depending information table 421 so as to group processors according to a shape and parallelism of a macro task graph, or a designation made by the user (S6).

That is to say, the compiler 40 analyzes a macro task MT of an upper grade hierarchical layer expressed by a macro task graph MTG, for instance, analyzes the shapes and the parallelism of the macro tasks MT1\_2 and MT1\_3 of FIG. 2 so as to group the general-purpose PEs 10 to 13 which are required in the processing of this macro task MT. Then, as previously described, the compiler 40 allocates the tasks MTs with respect to the general-purpose processor group PG and each of the accelerator groups.

When a load given to a specific-purpose processor is large due to the configuration of the macro task graph MTG, the processing is carried out by the general-purpose processor group PG instead of the accelerator group. It should be noted that the determined grouping information is held in the external storage apparatus 51 as a processor grouping table 422, and is used in a processing in a post stage.

In this embodiment, in the macro task graph MTG1 of FIG. 2, the process costs of the macro tasks MT1_2 and MT1_3 are nearly equal to each other, and in order to execute the macro task graphs MTG1_2 and MTG1_3 contained in these macro tasks, a specific-purpose processor must be controlled by a general-purpose processor. Thus, two general purpose processor groups PG1-0 and 1_1 are defined. Also, in the macro task graph MTG1_2, it is apparent that tasks which can utilize DRP and DSP are allocated in a static manner, so both the accelerator group DRP and the accelerator group DSP of FIG. 3 are defined as the accelerator groups.

(Macro Task Scheduling)

Subsequently, the compiler 40 performs scheduling operations of tasks MTs according to a static scheduling method and a dynamic scheduling method (S7). Although detailed contents as to the static and dynamic scheduling methods will be described later, these scheduling methods will now be simply explained.

First, if there is such an MT flow that a task MT contains no condition branch and the earliest execution condition can be previously determined, then the former static scheduling method is applied, and the compiler 40 previously schedules the tasks MTs so as to insert a synchronous code and an FV control code (scheduling code) between the tasks MTs (S8).

On the other hand, if there is such an MT flow which cannot be predicted during compiling operation (for instance, condition branch is contained in the task MT, or process time of the task MT is varied during execution), the latter dynamic scheduling method is applied, and thus, the compiler 40 produces a scheduling program for performing a control operation according to a status of a condition branch or the like during execution (S9).

Then, the compiler 40 compiles the scheduling codes with respect to each sort of the respective PEs 10 to 17 in order to produce an output code as the object code (S10). Now, in case of the dynamic scheduling method, a scheduling code corresponding to an instruction set of a general-purpose PE and an output code for a task with respect to a specific-purpose PE are contained. The output code of the task with respect to the specific-purpose PE produces both an output code which is described by an instruction set of the specific-purpose PE, and an output code which is described by the instruction set of the general-purpose PE. Then, at a time instant when the scheduling code is executed (scheduler), the compiler 40 judges whether to execute this task directed to the specific-purpose PE by the specific-purpose PE or by the general-purpose PE. When the task is executed by the specific-purpose PE, the output code described by the instruction set of the specific-purpose PE is allocated to the specific-purpose PE, whereas when the task is executed by the general-purpose PE, the task directed to the specific-purpose PE, which is described by the instruction set of the general-purpose PE, is allocated to the general-purpose processor group.

In the code producing processing for each of the PEs, in the static scheduling method, it is possible to grasp which sort of PE the task has been allocated to based on the scheduling code. As a result, the compiler 40 may merely produce the output code of the allocated PE with respect to a target task.

In contrast, in the dynamic scheduling method, even in the case of the tasks directed the specific-purpose PE, there are some possibilities that the tasks directed to the specific-purpose PE are executed by the general-purpose PE in order to avoid the processings from concentrating on the specific-purpose PE to excessively increase a process waiting time when the tasks are executed. Thus, as to the scheduling code produced by the dynamic scheduling method, the compiler 40 also produces the output code to be processed in the general-purpose PE in addition to the output code produced according to the sort of specific-purpose PE for to task directed to the specific-purpose PE.

A merit of the compiler 40 producing a scheduling program (scheduling code) is that, as in a conventional multiprocessor, when a production of coarse grain tasks and a scheduling operation are requested to an operating system or a library, overheads from several thousands of clocks to several millions of clocks can be avoided.

In the macro task scheduling a step S7, any one of a static scheduling a step S8 and a dynamic scheduling a step S9 is selected, based on the earliest execution condition or presence/absence of the condition branch in the macro task MT, and the selected scheduling method is executed. In the static scheduling step S8, an object code is statically determined for every macro task MT produced in the above-mentioned step S1. In the dynamic scheduling step S9, a scheduling code for performing a task control during execution is produced.

The static object code and the dynamic scheduling code are produced by executing the above-mentioned static scheduling the step S8 and dynamic scheduling code producing step S9 (S10). Then, these codes are converted into execution codes for each of the processors and these execution codes are outputted to the external storage apparatus or the like.

(Static Scheduling Process)

Figure 6:
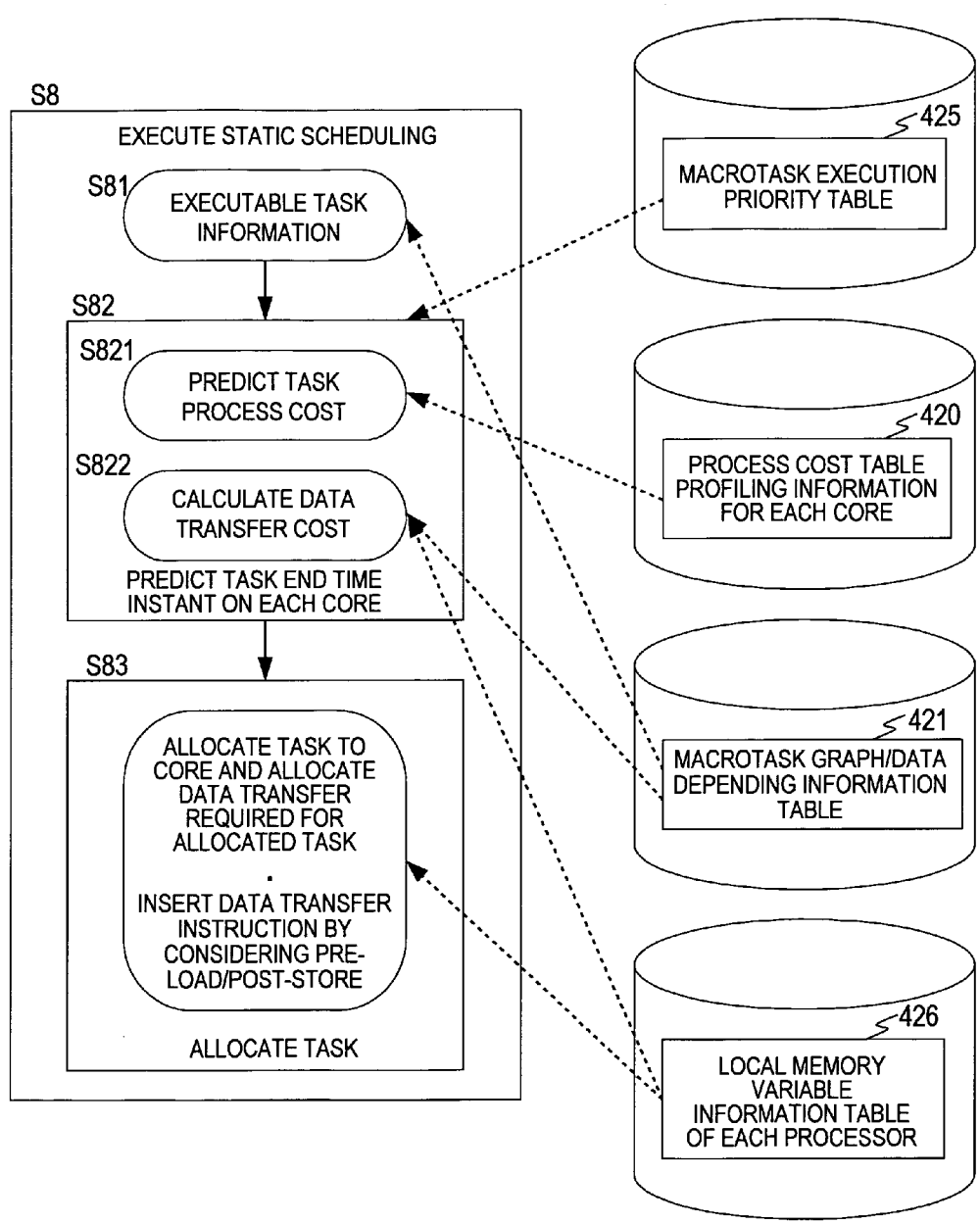
FIG. 6 is a flow chart for showing an outline of static scheduling executed in a step S8 of FIG. 4 according to the first embodiment of this invention.

First, referring to FIG. 6, description will be made of an outline of the static scheduling process.

When the compiler 40 commences the static scheduling step S8, the compiler 40 sets a scheduling time instant T to zero, and thereafter, selects a task MT having the highest priority GCP as a task MT for performing allocation from tasks MTs which can be executed at this time instant (S81). At this time, the compiler 40 temporarily sets a compile-purpose virtual ready queue, and populates the task MTs currently executable to this virtual ready queue. Then, the compile 40 sorts the tasks MTs of the virtual ready queue in the descending order from a higher priority GCP, and extracts a task MT having the highest priority GCP as a task MT for the allocation.

Next, as to the extracted task MT, the compiler 40 calculates a process cost for each of the PEs, and calculates data transfer costs from the macro task graph/data depending information table 421 and a local memory variable information table 426 to be described later to predict task end time instants on the respective processor groups (S82).

At this time, as a process cost for each of the tasks, such a process cost read out from the task process cost table 420 is employed for each of the PEs (S821). Also as a transfer cost of data, the compiler 40 predicts transfer costs of the data at the respective time instants based on depending characteristics of parallel executions from the macro task graph/data depending information table 421 and the local memory variable information table 426 (S822). The transfer cost of this data is used to predict such a data transfer information that data required by a task is loaded from a local memory LM 22 of another PE or a centralized shared memory CSM 18 to a local memory LM of the PE. It should be noted that the transfer cost of the data may be expressed by, for example, a clock number (latency), or the like. While a local memory LM is effectively utilized, such a data transfer cost whose data transfer time becomes minimum is selected.

Then, with respect to a task MT, a process cost and a data transfer cost on each of the processor groups are added in order that a cost (execution cost) required for the execution is predicted and calculated.

Next, the compiler 40 adds a time corresponding to an execution cost at a subject time instant for each of the processor groups or each of the PEs so as to predict an end expression.

In other words, the end time instant is expressed by the following expression:

end time instant=end time instant of currently allocated last task+data transfer times (including data transfer times before/after task is processed)+task process time.

With respect to the subject task MT, the above-mentioned end time instant is calculated for each of the processor groups. It should be noted that a shortest end time instant corresponds to an earliest end time instant selected from time instants by which the selected tasks are expected to end when assuming that a selected task has been executed by a certain processor group or a certain PE. In other words, the shortest end time instant is an end time instant which does not contain a variation factor, for example, a transfer waiting status of data.

It should be noted that in a case where the subject processor is a DRP in the above-mentioned calculation of the end time instant, when the configuration of the DRP core of this DRP must be changed, an overhead (changing time) required for changing the DRP core is added in the calculation of the end time instant.

Next, the compiler 40 allocates the task to a processor group whose end time instant is the earliest (=process time is short=process cost is low) based on the end time instant for each of the processor groups of each task (S83). In other words, even in the case of a task which is to be originally executed in the accelerator group DRP or DSP, when the processings are concentrated on the group of the accelerators, the compiler 40 allocates this task to the general-purpose processor group PG. For instance, in a case where the processings are concentrated on the accelerator groups DSP and DRP, if the task is allocated to the accelerator groups, process waiting time is prolonged. Accordingly, by allocating the task MT directed to the accelerator group to the general-purpose processor group PG, although an execution time itself becomes longer than that for the accelerator group, an end time instant becomes earlier with the exclusion of a waiting time. As a result, the entire process time of the macro task MT is shortened.

As previously described, in the static scheduling processing, the tasks are allocated in the unit of the processor group. In addition, the tasks may be alternatively allocated for each of the PEs. In other words, in the macro task graph MTG to which the static scheduling process is applied, there is no element for causing variation of the sequence of the processing and the tasks to be executed at the execution time, so the tasks can be individually allocated for each of the general-purpose PEs and each of the specific-purpose PEs.

Next, when the allocation of the tasks is determined, the compiler 40 refers to the macro task graph/data depending information table 421 to insert a transfer instruction of data, if required. The data transfer instruction is required for executing the tasks MTs allocated to the processor group.

In this case, as the transfer instruction of the data, there are a preload instruction and a post store instruction. The preload instruction clearly reads the data before the task MT is executed. The post store instruction clearly writes the data after the task MT is executed.

The preload instruction executes such a processing that while the DMAC of the DTU 24 is employed, the data is read from the CSM 18 or the DSM 23 of another PE to the DSM 23 or the local memory 22 of the own PE in the background of the task processing on each of the PEs.

The post store instruction performs such a processing that the data of the DSM 23 or the local memory 22 of the PE is written into the CSM 18 or the DSM 23 of another PE in the background of the task processing.

The inserting processing of the preload instruction is carried out as follows. That is, when data which is required in the task MT is not stored in the local memory 22, before the execution of the task MT is commenced, while the execution of the task MT is overlapped with the execution of another task (namely, task before execution of task MT) by the DMA of the DTU 24, the preload instruction is loaded in a memory (local memory LM 22 or distributed shared memory 23) located in the vicinity of the core of the PE.

That is to say, with respect to the data required in the task MT whose allocation is completed, the compiler 40 refers to the macro task graph/data depending information table 421 and the local memory variable information table 426 in order to specify a location of the required data. Then, if the required data is present in either another processor element or the CSM 18, the compiler 40 inserts a command for transferring the data to the local memory 22 of the PE into the input program 400. Otherwise, if the required data is present in the distributed shared memory 23 of the PE, the compiler 40 inserts a command for transferring the data to the local memory 22 of the PE into the input program 400. It should be noted that the preload instruction is different from a prefetch which is hardware-installed by a general-purpose processor, but is clearly added in correspondence with the task MT.

Also, as to storing of data after the task MT has been accomplished, data which is accessed only by the subsequent task allocated to the same PE is not stored in the centralized shared memory 18 or the distributed shared memory 23, but is left on the local memory 22. Then, the compiler 40 inserts into the input program 40 a post store command by which data stored in the local memory 22 when the execution of the last task which accesses the data is ended is written in the centralized shared memory 18 or the distributed shared memory 23 within the tasks contained in the execution queue. More specifically, in the static scheduling processing, the compiler 40 may arrange the data transfer instruction in a proper place while viewing the entire program.

As previously described, the transfer instruction of the data is clearly inserted based on the hierarchical structure of the macro task graph, so the data transfer cost can be suppressed to the minimum cost. In other words, the delay occurred in the data transfer operation when the task is started can be suppressed, and also, the useless store processing, for instance, reading again the data utilized in a task immediately before the task in the local memory 22, can be suppressed.

Figure 7:
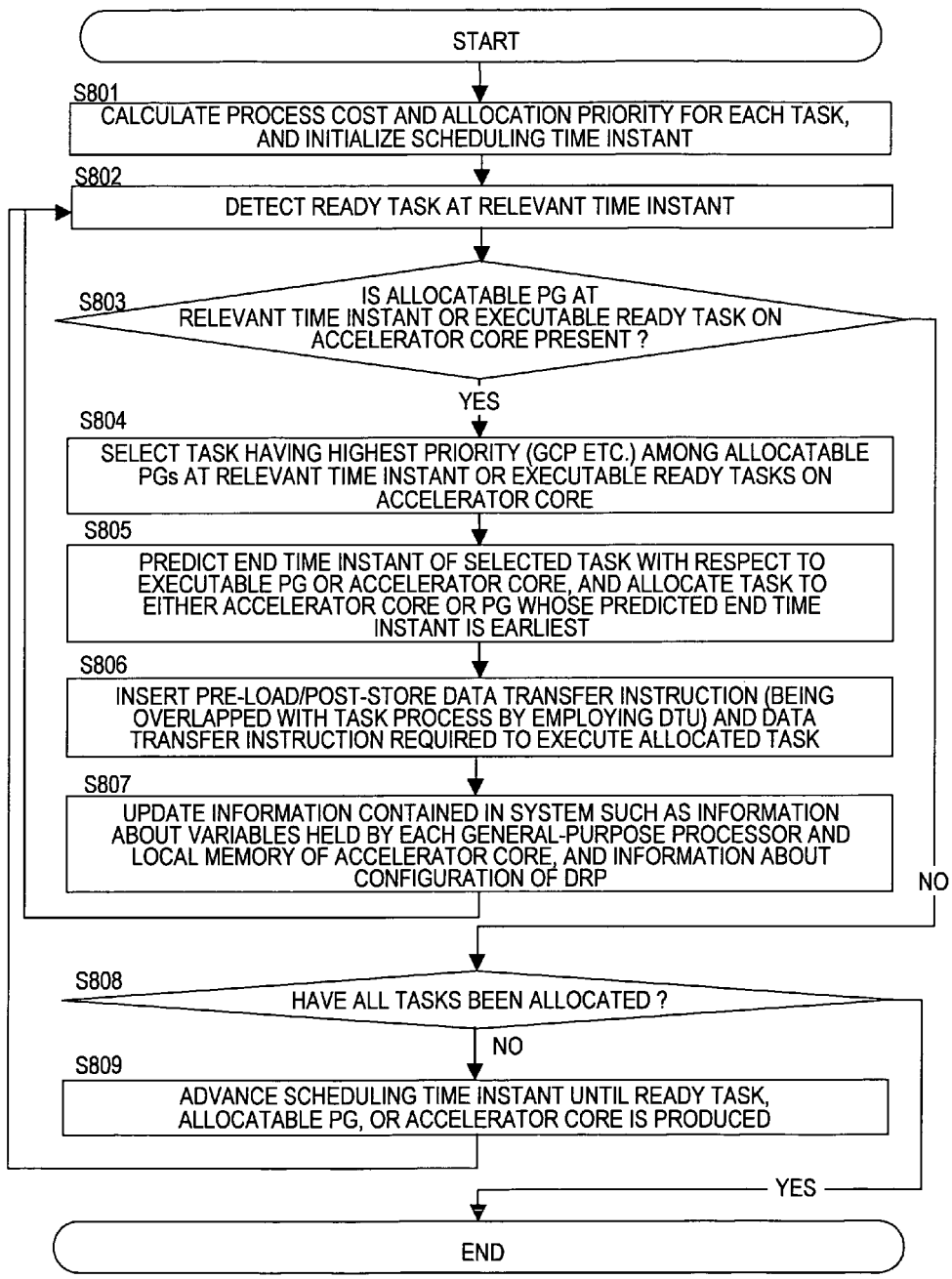
FIG. 7 is a flow chart for showing a detailed content of the static scheduling executed in the step S8 of FIG. 4 according to the first embodiment of this invention.

FIG. 7 is an example of a flow chart for showing a detailed operation of the static scheduling step S8 executed in the compiler 40. This flow chart shows the processing for processing the macro tasks which are allocated from the macro task MT obtained by scheduling of the upper grade hierarchical layer to the different processor groups (general-purpose processor group PG and accelerator group) at the same time instant.

First, in a step S801, the compiler 40 calculates a process cost and a priority GCP as to the subject task by referring to the task process cost table 420 and the macro task execution priority table 425. Then, a time instant of scheduling is initialized (for example, reset to zero).

In a step S802, the compiler 40 detects a task MT executable on either an allocatable general-purpose processor group PG or an allocatable accelerator group (on accelerator core) in the macro task graph MTG under execution at the present time instant T. The compiler 40 refers to the macro task graph/data depending information table 421 so as to extract the task MT whose allocation is yet to be completed among the tasks MTs which can satisfy the earliest executable condition at the present time instant T.

In a step S803, the compiler 40 judges whether or not a task for an allocation subject is present at the time instant. As the conditions of the task for the allocation subject, the task MT is executable on the executable general-purpose processor group PG or the executable accelerator group (on accelerator core), and is contained in the executable tasks MTs extracted in the step S802. If there is a task MT which can satisfy the conditions, the processing advances to a step S804, whereas if there is no task MT which can satisfy the conditions, the processing advances to a step S808.

In the step S804, the compiler 40 selects a task MT which should be allocated. In this step, the compiler 40 acquires priorities GCPs with respect to the tasks MTs which can satisfy the condition of the above-mentioned step S803 with reference to the execution priority table 425, and selects a task MT having the highest priority GCP as the task MT whose allocation is performed.

In a step S805, the compiler 40 determines a processor group to which the selected task MT is allocated. As previously described, with respect to the selected task MT, the compiler 40 calculates a process cost and a data transfer cost of this selected task MT on a processor group (general-purpose processor group PG or accelerator group) which can execute the selected task MT. Also, the compiler 40 predicts and calculates end time instants of the task MT on the respective processor groups, and then, selects a processor group whose end time instant is earliest. This processor corresponds to the general-purpose processor group PG, the accelerator group, or the accelerator core (specific-purpose PE).

In the step S806, as previously described, the compiler 40 refers to the macro task graph/data depending information table 421 so as to insert a data transfer instruction which is required to execute the task MT allocated to the processor group or a preload/post store data transfer instruction which is carried out to be overlapped with the task processing, if necessary.

In a step S807, the compiler 40 writes information (contents such as data) of the local memories 22 which are held by all of the PEs 10 to 17 at the present time instant T, and also the configurations (including changes in configurations of DRP cores) of the DRPs 14 and 15 into the local memory variable information table 426. Since the variable information of the local memories 22 at the respective time instructs has been stored in this local memory variable information table 426, the compiler 40 can grasp which data is present in which processor element PE. By using this table 426, the compiler 40 can execute a scheduling processing capable of minimizing the transfer cost of the data. Also, the compiler 40 properly updates the information within the system if necessary in addition thereto. After the processing of the step S807 is carried out, the processing again returns to the step S802 in which the compiler 40 performs a judging processing for judging whether or not there is a task which should be allocated, and detects a ready task.

In a step 808, if all of the tasks MTs have already been allocated to the processor groups, the compiler 40 accomplishes the processing, whereas if there is a task MT yet to be allocated, the processing advances to a step S809.

In the step S809, the compiler 40 adds a predetermined value to the present time instant T, and advances the processing up to a time instant when a new ready task is produced, or when an allowable general-purpose process or group or an accelerator core is produced, and thereafter, the processing returns to the previous step S802.

By carrying out the above-mentioned processings, the static scheduling processing is accomplished with respect to the macro tasks MTs having no condition branch, so all of the tasks MTs are allocated to the respective processor groups according to the hierarchical layer of the macro task graph MTG.

Subsequently, the compiler 40 can execute a static FV scheduling processing. In this scheduling processing, the compiler 40 judges a margin degree which is determined by a process cost of a task and a schedule time limit (processing time limit) based on the scheduling information produced in the macro task scheduling step S7, and the compiler 40 sets a PE operation mode for determining an operating frequency and a supply voltage depending on the judged margin degree, so the compiler 40 produces FV control information. This FV control information is stored in the external storage apparatus as a power supply/FV control schedule table 422. It should be noted that a margin degree is calculated based on, for instance, a process time from a start of an execution until the execution is completed, and a time duration up to a process time limit, and also indicates a degree of margin as to performance of each of the PEs 10 to 17. For instance, in the case where a time from a completion of an execution by the CPU0 up to a process time limit is long, the compiler 40 may judge that the margin degree is large. Conversely, in the case where a time from a completion of an execution by the CPU0 up to a process time limit is short, the compiler 40 may judge that the margin degree is small.

Alternatively, the process time limit (allowable time) may be described in the input program 400, or may be entered from a console (not shown) when the processing by the compiler 40 is performed.

(Dynamic Scheduling)

Next, a description is made of the producing operations of the dynamic scheduling code (S9) shown in FIG. 4.

When the dynamic scheduling processing is carried out, the scheduling contents cannot be determined during the compiling operation due to an indefinite element such as a condition branch within a task MT. As a consequence, the compiler 40 produces a scheduling code (scheduling program) for dynamically performing a scheduling processing based on a process result of a task MT when a program is executed.

A scheduling code initiates and synchronizes a task MT based on a process result, and loads data which is required for this task MT.

In this case, the scheduling code by the dynamic scheduling processing of this invention is executed as a scheduler in the general-purpose processor group PG. Then, the scheduler changes a ready queue and an execution queue of the general-purpose processor group PG in response to layering of a macro task MT. In this case, a ready queue is a storage area which temporarily stores an executable task, and one ready queue is allocated to a group of the general-purpose processor group PG. Also, an execution queue EC is a storage area which temporarily stores an allocated task MT, and one execution queue EC is allocated to each of the processor groups. As will be discussed later, a ready queue is set in a shared storage area which can be shared among processors, and capable of exclusively controlling (can lock) an access. As this shared storage area, the centralized shared memory (CSM) 18, and the distributed shared memory (DSM) 23 are provided.

(Concept of Scheduler)

Figure 8:
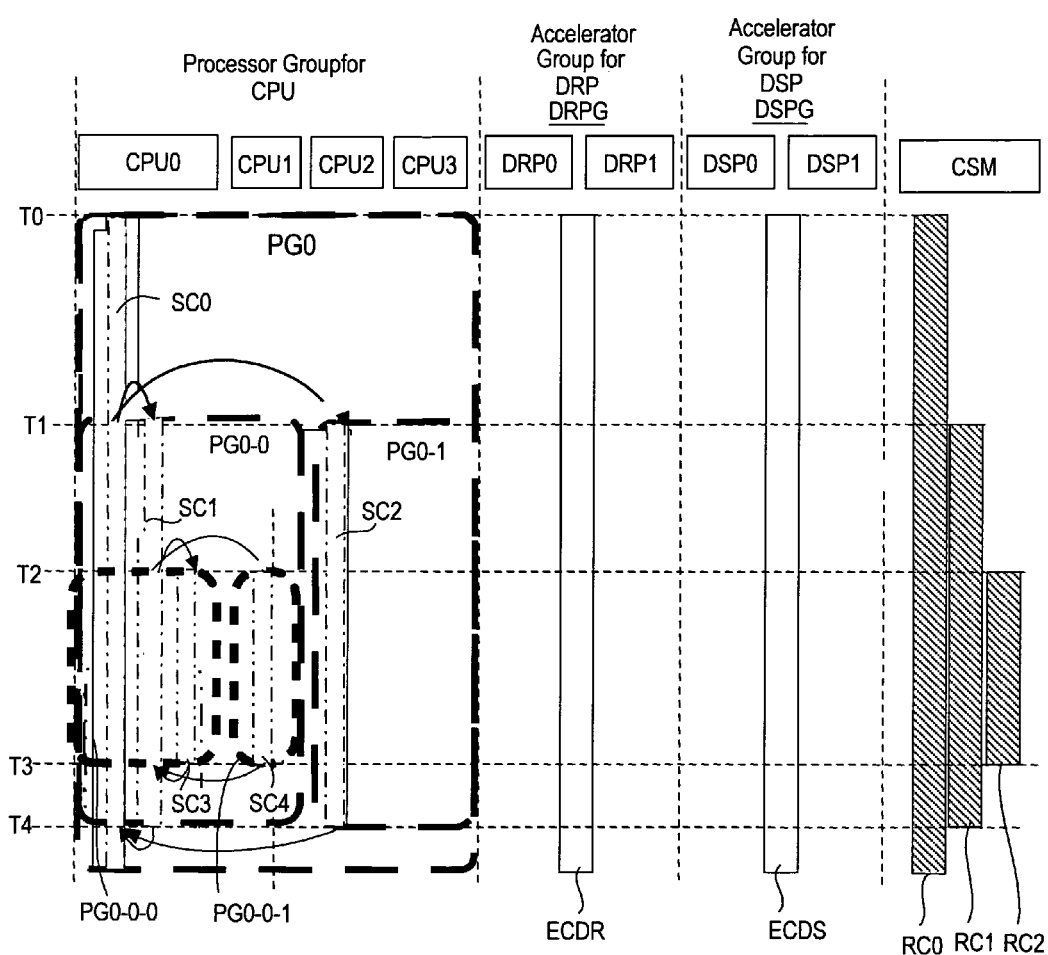
FIG. 8 is an explanatory diagram for showing a queue status of the processor system according to the first embodiment of this invention.

Referring to FIG. 8, description will be made of a concept of the scheduler (scheduling code) in the dynamic scheduling processing. FIG. 8 shows an example where a task MT is executed from a time instant T0 on the heterogeneous multi-processor system 1 by the dynamic scheduling processing. It should be noted that this example corresponds to a case where a distributed type dynamic scheduling processing is employed, in which each of the general-purpose processor groups executes both a task processing and a scheduling operation. Alternatively, a centralized type dynamic scheduling method may be employed, in which a certain general-purpose processor specially performs a scheduling processing by considering parallelism degrees of the respective hierarchical layers, and a total number of usable processors.

In this example, for the sake of simple explanations, the dynamic scheduling method is applied to all of the hierarchical layers. As previously described, originally, a static scheduling method and a dynamic scheduling method are properly and separately utilized based on internal information of a macro task graph.

While a general-purpose processor group PG0 contains the CPU0 to the CPU3, the processor group at the time instant T0 is composed of a DRP group DRPG containing two pieces of DRP0 and DRP1, and a DSP group DSPG containing two pieces of DSP0 and DSP1 in the accelerator groups.

First, at the time instant T0, a scheduler SC0 is executed on one representative processor (namely, CPU0 in this drawing) among the general-purpose processors contained in the general-purpose processor group PG0. Then, for example, a ready queue RC0 is set in the centralized shared memory (CSM) 18, and an execution queue EC0 (not shown) corresponding to the general-purpose processor group PG0 is set in the distributed shared memory (DSM) 23 of the CPU0. Also, as to each of the accelerator groups, a single execution queue is allocated. An execution queue ECDR is set in the DSM 23 of the DRP0 in the DRP group DRPG, whereas an execution queue ECDS is set in the DSM 23 of the DRP0 in the DSP group DSPG.

The scheduler SC0 stores executable tasks MTs in the ready queue RC0, and allocates the tasks MTs to the respective execution queues EC0, ECDR, and ECDS in the order of the priority levels. In each of the processor groups, the processor elements PE 10 to PE 17 contained in each of the processor groups acquire the tasks of the execution queues EC0, ECDR, and ECDS so as to execute the acquired tasks.

At a time instant T1, the general-purpose processor group PG0 is grouped therein to two processor groups in a hierarchical manner according to parallelism in macro task graphs within the tasks allocated to this processor groups PG0 by the scheduler SC0. In FIG. 8, this general-purpose processor group PG0 is grouped to a PG0-0 made of the CPU0 and CPU 1, and a PG0-1 made of the CPU2 and the CPU3. At this time, a scheduler SC1 and another scheduler SC2 corresponding to the internal hierarchical layer are initiated respectively on the CPU0 contained in the PG0-0, and the CPU2 contained in the PG0-1, the ready queue RC1 is set to the centralized shared memory (CSM) 18, an execution queue EC1 (not shown) is set to the DSM 23 of the CPU0, and an execution queue EC2 (not shown) is set to the DSM 23 of the CPU2. At this time, in the CPU0, a control is transferred from the scheduler SC0 to the scheduler SC1 corresponding to the internal hierarchical layer.

In this example, when a task having a hierarchical layer in the own task is executed, the scheduling processing is assigned to a scheduler corresponding to the internal hierarchical layer, and when the processing of the internal hierarchical layer is ended then a processing returns to an upper grade hierarchical layer, a control is again transferred to the scheduler corresponding to the original hierarchical layer.

Next, it is assumed that at a time instant T2, the scheduler SC1 allocates a task to the general-purpose processor group PG0-0. In the case where this task contains therein a macro task graph, general-purpose processors contained in this processor group PG0-0 are further grouped in a hierarchical manner according to parallelism of the internal tasks. In this case, the general-purpose processor group PG0-0 is divided into groups PG0-0-0 and PG0-0-1. Also, a ready queue RC2 corresponding to this internal macro task graph is set in the centralized shared memory (CSM) 18, and an execution queue EC2 (not shown) is set in the DSM 23 of the CPU 1. In addition, schedulers SC3 and SC4 corresponding to this hierarchical layer are initiated on the CPU0 and the CPU1 respectively. In the CPU0, a control is transferred from the scheduler SC1 to the scheduler SC3 which corresponds to the internal hierarchical layer in a similar manner to the case at the time instant T1.

Assuming now that a processing of a third hierarchical layer in which the processor group PG0-0 has been divided into the groups PG0-0-0 and PG0-0-1 so as to be processed at a time instant T3 is accomplished, the processing returns to such a hierarchical layer higher than the third hierarchical layer by one layer at this time. At this time, the scheduler SC3 which has performed the processing on the CPU0 and the scheduler SC4 which has performed the processing on the CPU1 are ended, and then, a scheduler SC1 being the scheduler for handing the hierarchical layer higher by one layer is again utilized. Further, assuming now that a processing of a second hierarchical layer in which the processor group PG0 has been divided into the groups PG0-0 and PG0-1 so as to be processed at time instant T4 is accomplished, at this time, the schedulers SC1 and SC2 are ended, and the processing advances to the main hierarchical layer. That is to say, the scheduler SC0 again handles the scheduling processing.

Up to the time instant T4 after the time instant T1, the general-purpose processor groups PG are grouped in the hierarchical manner, and the schedulers SC are operated in each of the hierarchical layers, or the general-purpose processor groups. These schedulers SC mutually refer to the execution queues ECDR and ECDS of the accelerators so as to adjust the allocations of the tasks. As a result, it is possible to avoid that the processings are biased to the specific-purpose PE of the accelerator group.

For instance, when the scheduler SC1 of the general-purpose processor group PG0-0 utilizes the DSP group DSPG, this scheduler SC1 refers to the execution queue ECDS of the DSP group. If a plurality of tasks have already been populated, then the scheduler SC1 compares a scheduled end time instant in a case where the tasks are executed by the DSP with a scheduled end time instant in a case where the tasks are executed by the own general-purpose processor group PG0-0. Based on this comparison result, the scheduler SC1 selects the earlier scheduled end time instant, and then populates the selected end time instant to the own ready queue RC1.

Further, the scheduler SC1 may refer to a condition of a ready queue which corresponds to another hierarchical layer or a macro task graph, and considering priority levels of the respective tasks, may flexibly utilize the accelerators with a higher efficiency.

FIG. 8 shows an example where the ready queues RC0, RC1, RC2 are set in the centralized shared memory (CSM) 18. Alternatively, the centralized shared memory 12 may be replaced by a shared memory capable of selectively locking accesses from other PEs. For example, the ready queue RC may be set in the distributed shared memory 23 of each of the general-purpose processors CPU0 to CPU3. Also, FIG. 8 shows a case where the ready queues RCs are prepared one by one with respect to the respective hierarchical layers. Alternatively, in order to classify the ready queues RCs based on the sort of macro task, a plurality of ready queues RCs may be prepared for a single macro task graph so as to be utilized. Further, in this example, the schedulers are separately initiated for the respective hierarchical layers. Alternatively, in the case where a scheduler is continuously operated on the same processor when a processing is transferred to a lower grade hierarchical layer, a scheduler for an upper grade hierarchical layer may be continuously utilized.

In the above-mentioned example, a scheduler which handles a certain hierarchical layer is continuously operated on a single certain processor. Alternatively, in the case of a distributed scheduler, in order to operate a scheduler, this scheduler may be operated on any of representative processors contained in a general-purpose processor group, and also a processing of the scheduler may be dynamically moved to another general-purpose processor within a processor group, depending on conditions of a memory and a load. For instance, in FIG. 8, although the scheduler SC0 is always operated on the CPU0, the processing of the scheduler may be moved to any one of the CPU0 to CPU3, which are participated in the same general-purpose processor group PG0, depending on the conditions of the load and the memory.
(Scheduling Code)

Figure 9:
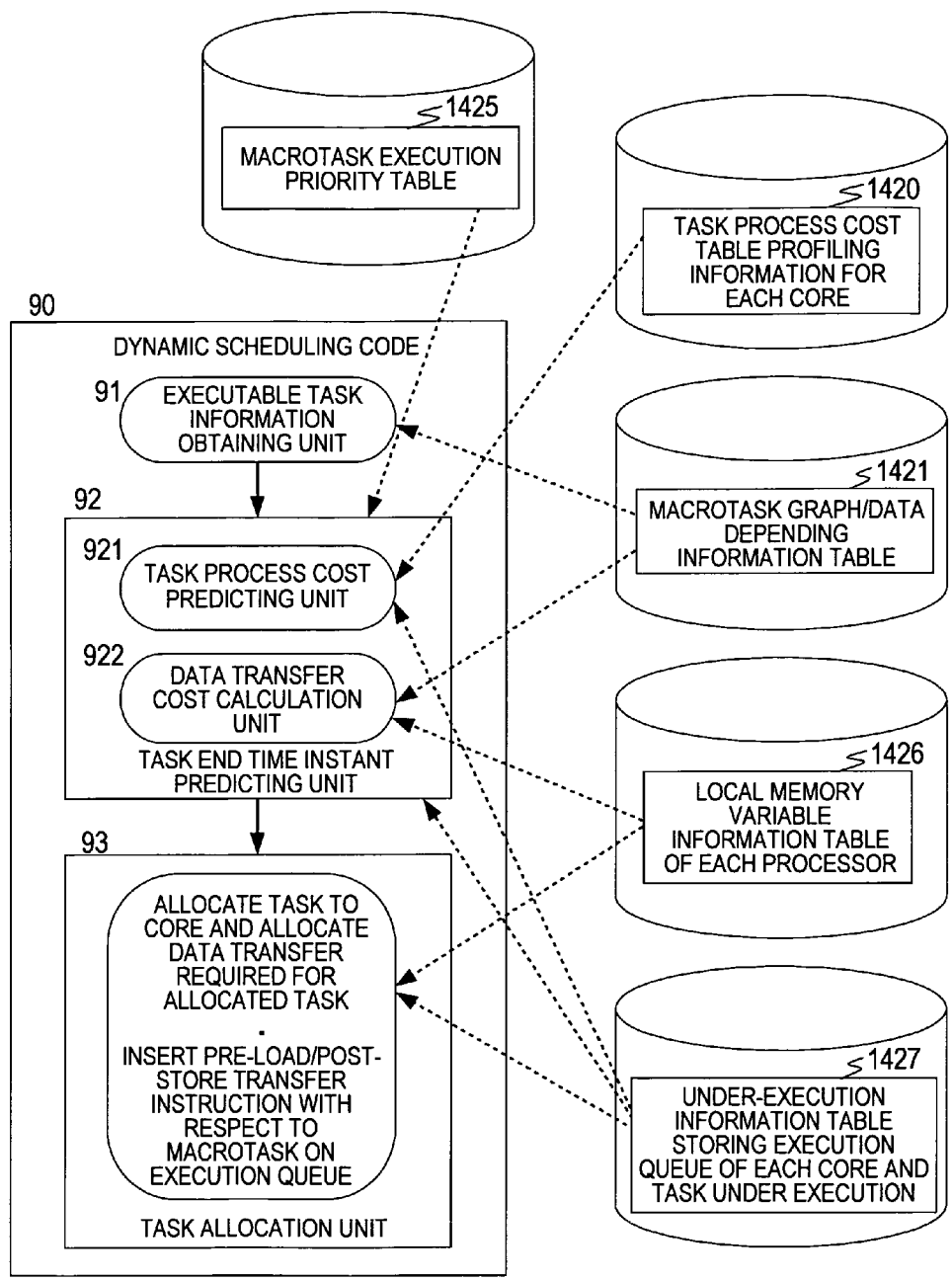
FIG. 9 is a flow chart for showing an outline of dynamic scheduling executed in a step S9 of FIG. 4 according to the first embodiment of this invention.

Next, referring to FIG. 9, a description is made of a scheduling code by a dynamic scheduling processing.

The compiler 40 produces a dynamic scheduling code 90 of FIG. 9 by executing a dynamic scheduling code step S9. It is so assumed that a function when the dynamic scheduling code 90 is executed by the CPU0 to CPU3 is defined as the scheduler SC.

The dynamic scheduling code 90 contains an executable task information acquiring unit 91, a task end time instant predicting unit 92, a task allocating unit 93, a task process cost table 1420, a macro task graph/data depending information table 1421, a macro task execution table 1425, a local memory variable information table 1426, and a task under execution information table 1427. It should be noted that the respective tables 1420 to 1426 have similar configurations to those of the task process cost table 420, the macro task graph/data depending information table 421, the macro task execution priority table 425, and the local memory variable information table 426, which are employed in the above-mentioned static scheduling step S8. These tables 1420 to 1426 are produced by the compiler 40.

The task under execution information table 1427 stores therein both information as to execution queues of the respective processor groups at each of time instants, and information as to the tasks MTs executed at each of the time instants. When a plurality of schedulers are initiated, the respective tables 1420 to 1427 are arranged in the memory CSM 18, and then, the plurality of schedulers may refer to, and may update these arranged tables 1420 to 1427.

The executable task information acquiring unit 91 extracts such a task MT which is executable and has not yet been allocated at the present time instant T from the macro task graph/data depending information table 1421.

The task end time instant predicting unit 92 refers to priority GCP for each of the tasks from the macro task execution priority table 1425 as to the extracted task MT so as to select such a task MT having the highest priority value.

Then, a process cost is calculated with respect to the selected task MT for each of the processor groups based on the macro task execution priority table 1425, and also, a data transfer cost is calculated from the macro task graph/data depending information table 1421 and the local memory variable information table 1426. Similarly to the above-mentioned static scheduling method, the task end time instant predicting unit 92 predicts a task end time instant for each of the processor groups based on the process cost and the data transfer cost every processor group. In other words, an end time instant (earliest end time instant) is predicted and calculated from an execution cost obtained by adding the process cost to the data transfer cost in a similar manner to the above-mentioned static scheduling method.

To this end, the task process cost predicting unit 92 contains a task process cost predicting unit 921, and a data transfer cost calculating unit 922. The task process cost predicting unit 921 calculates a process cost for each of the processor groups of the extracted task MT based on the cost read out from the task process cost table 1420. The data transfer cost calculating unit 922 calculates a data transfer cost from a depending relationship among the tasks of the macro task graph/data depending information table 1421 and a position of data contained in the local memory variable information table 1426.

Then, as to an end time instant of a task, while referring to the ready queue RC, or the execution queue EC of each of the processor groups, if there is such a task under execution, an end time instant of this task under execution is added to the above-mentioned end time instant, and the added time instant is added to an end time instant of a task which will be allocated.

When the prediction of the end time instance of the ready task executable at the present time instant T is completed, the task allocating unit 93 allocates a task MT to a processor group.

The task allocating unit 93 allocates the subject task MT to such a processor group having earliest end time instant. That is, the task allocating unit 93 populates the selected task MT to the execution queue EC.

Next, when the task allocation is determined, the compiler 40 refers to the macro task graph/data depending information table 421 and the local memory variable information table 426 in order to specify a location of required data. Then, if the required data is present in another PE or the CSM 18, then the compiler 40 inserts a command for transferring the required data to the local memory 22 of the PE into the scheduling code. Otherwise, if the required data is present in the distributed shared memory 23 of the PE, then the compiler 40 inserts a command for transferring the required data from the distributed shared memory 23 of the PE to the local memory 22 into the scheduling code. Similarly to the static scheduling processing, in the dynamic scheduling processing, the transfer instruction of the data is inserted. However, in the dynamic scheduling processing, such a technical point that the data transfer instruction is inserted in the scheduling code 90 is different from the static scheduling processing. In the above-mentioned description, the command for transferring the data to the local memory 22 is inserted in the scheduling code 90. However, this invention is not limited only thereto. For instance, the data transfer instruction may be added to the task MT within the execution queue EC, or may be populated as one sort of task in the execution queue EC.

Also, although the data transfer is required before and after the task is executed, there are some cases where a preload instruction and a post store instruction cannot be inserted, depending on the content of the local memory 22, and the contents of the shared memories (DSM and CSM). In a case, an initiation code and the like which cause the data transfer unit 24 to execute the data transfer operation may be previously contained in the execution code of the task MT.

According to the data transfer instruction, similar to the static scheduling processing, in this dynamic scheduling processing, the data transfer cost can be suppressed to minimum. With employment of the above-mentioned function, the dynamic scheduling code 90 allocates the tasks MTs with respect to a plurality of processor groups. It should be noted that the dynamic scheduling code 90 is initiated at a time instant when the processing of the hierarchical layer is commenced to which the dynamic scheduling processing is applied by the condition branch and the like, and at the same time, the ready queue RC and the execution queue EC are set. Further, when the dynamic scheduling processing is again applied in a lower grade hierarchical layer, the scheduler corresponding to the hierarchical layer is newly initiated when the processing of the hierarchical layer is commenced.

It should be noted that the dynamic scheduling code 90 is executed by selecting any one system from a distributed scheduling system and a centralized scheduling system based on parallelism of the hierarchical layer and a total number of executable processors. In the hierarchical layer where the distributed scheduling system is selected, the scheduler is operated on each of the general-purpose processor groups within this hierarchical layer, and the scheduling processing and the task execution are alternately carried out. In the centralized scheduling system, one certain general-purpose processor among the general-purpose processors participating in a processing of this hierarchical layer is defined as a processor group in which a scheduler is operated, and handles a task allocation with respect to a general-purpose processor group including other general-purpose processors, or the own general-purpose processor. At this time, processor groups other than the processor group which handles the scheduling processing do not perform the scheduling processing, but concentrate on the task execution.

Figure 10:
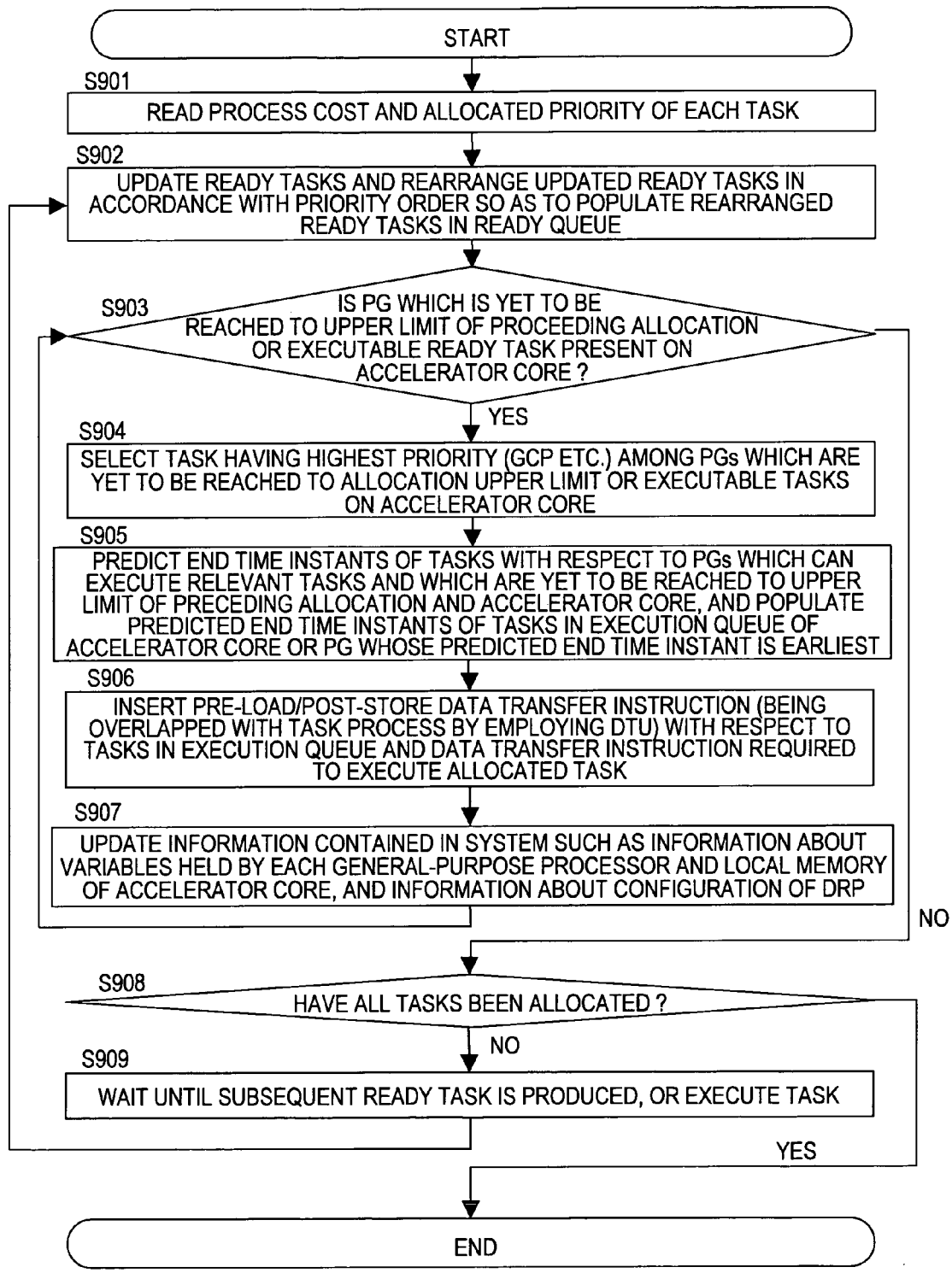
FIG. 10 is a flow chart for showing a detailed content of the dynamic scheduling executed in the step S9 of FIG. 4 according to the first embodiment of this invention.

FIG. 10 is a flow chart for representing an example of a processing executed in the dynamic scheduling code 90 (scheduler SC).

First, in a step S901, the scheduler SC reads the task process cost table 1420, the macro task graph/data depending information table 1421, the macro task execution priority table 1425, and the local memory variable information table 1426, which are produced during compiling operation, so as to acquire process costs and priority levels of the respective tasks MTs.

In a step S902, the scheduler SC updates ready tasks corresponding to such tasks MTs executable at the present time instant T, refers to the macro task execution priority table 1425 so as to sort the updated ready tasks in the order of higher priority GCP, and populates the sorted ready tasks to the ready queue RC of the general-purpose processor group PG which executes the present scheduler SC.

In a step S903, the scheduler SC judges whether or not there is such a task MT which constitutes a task to be allocated at the present time instant T. As a condition of the task MT which should be allocated, such a condition is given. That is, the ready queue has been populated in the step S902, and the task MT can be executed on either a general-purpose processor group or an accelerator core which is not reached to an upper limit of a preceding allocation at the time instant. If the task MT which can satisfy the above-mentioned condition is present, the processing advances to a step S904, whereas if such a task MT is not present, the processing advances to a step S908.

In the step S904, the scheduler SC refers to the macro task execution priority table 1425 so as to select such a task MT having the highest priority GCP from the tasks MTs which satisfy the condition of the above-mentioned step S903.

In a step S905, the scheduler SC refers to the costs of the macro task execution priority table 1425 so as to calculate a process cost for each of the processor groups as to the selected task MT. Further, the scheduler SC calculates a data transfer cost as to this selected task MT based on the depending relationship among the tasks of the macro task graph/data depending information table 1421, and the data position of the local memory variable information table 1426. The scheduler SC calculates process end time instant for each of the processor groups based on the calculated process cost and data transfer cost as to the selected task MT.

Then, the scheduler SC selects such a processor group whose end time instant is earliest, and in which tasks MTs allocated to the execution queue EC are yet to be reached to the upper limit value (upper limit value of preceding allocation). The scheduler SC populates the selected task MT to the execution queue EC of this selected processor group.

In a step S906, the scheduler SC inserts a data transfer instruction required to executing the populated task MT, and a data transfer instruction for the task contained in the execution queue EC. It should be noted that as the data transfer instruction, such an instruction as the above-mentioned preload instruction and post store instruction is included by which a data transfer operation is performed by the DTU 24 in the background of the task processing.

In a step S907, the scheduler SC writes information of the local memory 22 held by each of the PEs at the present time instant T, and the configurations (e.g., changes in configuration of DRP core) into the local memory variable information table 1426. In addition, the scheduler SC properly updates information in the system, if necessary. After the processing of the step S907, the processing returns to the step S903 in which the scheduler SC judges whether or not a task which should be allocated is present.

In a step S908, if all of the tasks MT have been allocated, then the scheduler SC accomplishes the processing, whereas if there is a task MT yet to be allocated, the processing advances to a step S909.

In the step S909, the scheduler SC waits until a new ready task is produced, or allocates a task MT to the own process, and thereafter, the processing returns to the step S902.

The above-mentioned processings of FIG. 10 are executed, whereby the scheduling processing is dynamically executed as to the macro task MT containing the condition branch, the accelerator groups are commonly used from the plurality of schedulers SCs, and thus, all of the tasks MTs may be allocated to the optimum processor groups in response to the hierarchical layer of the macro task graph MTG.

(Scheduling Results)

Figure 11:
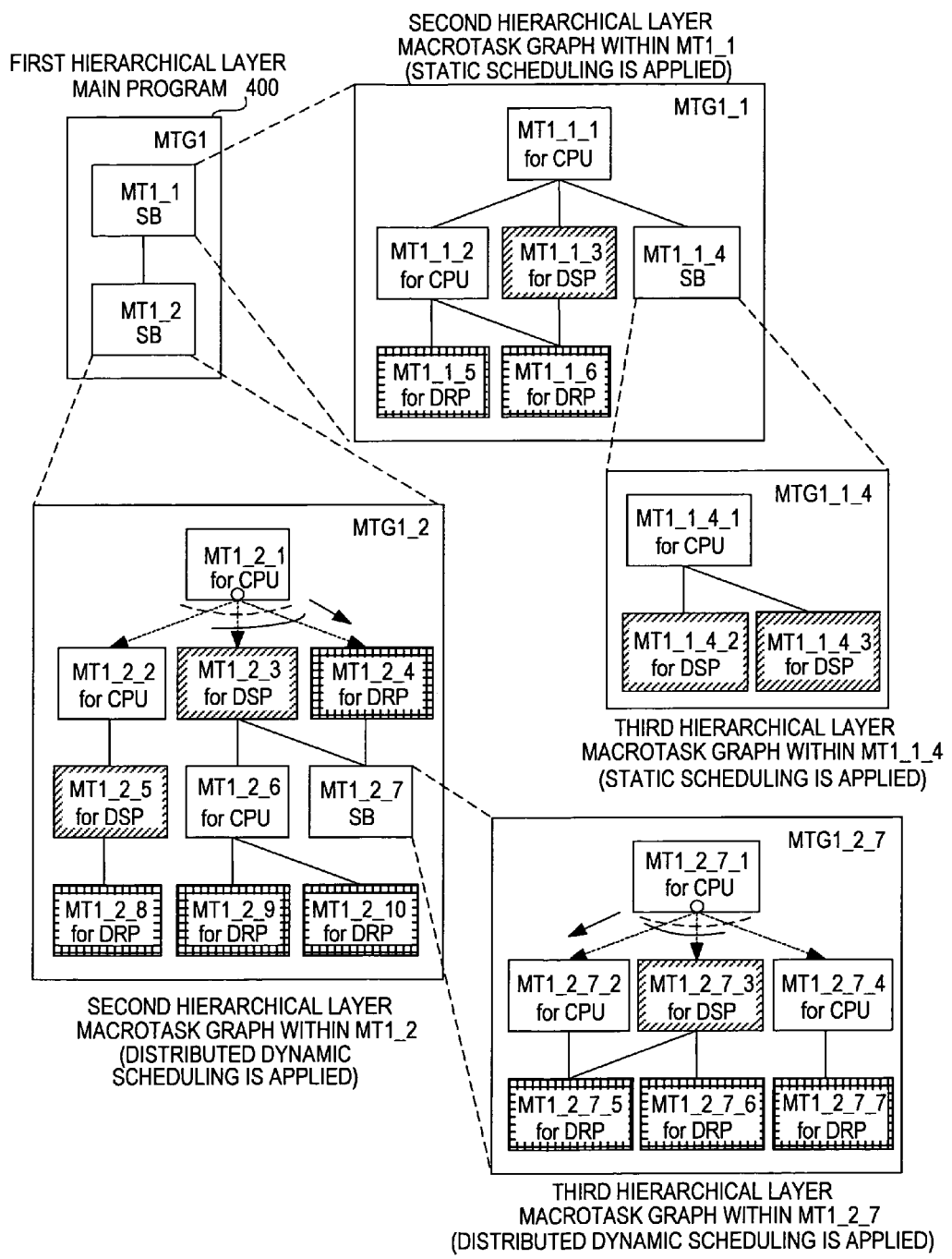
FIG. 11 is a macro task graph for showing a depending relationship among tasks produced by the compiler which analyzes an input program according to the first embodiment of this invention.

FIG. 11 shows an example of a macro task graph which is entered as the input program 400 in the compiler 40 to be produced.

As a result of analyzing the input program 400 by the compiler 40, as shown in FIG. 11, the macro task graph MTG1 of the input program 400 is divided into two macro tasks MT1_1 and MT1_2 in such a manner that these macro tasks MT1_1 and MT1_2 are sequentially processed. It should be noted that representations in this drawing are similar to those of FIG. 2. Also, hatching of inclined lines in this drawing indicates tasks directed to DSPs, whereas hatching of cross lines shows tasks directed to DRPs. In this drawing, tasks having no hatching indicate tasks directed to general purpose processor DPUs.

The macro tasks MT1_1 and MT1_2 constitute sub-routines. The macro task MT1_1 constitutes macro tasks of 3 hierarchical layers. A macro task graph MTG1_1 of the macro task MT1_1 is composed of tasks MT1_1_1 to MT1_1_6 which have no variable element such as a condition branch having three pieces of parallelism in maximum. Among these tasks, the task MT1_1_4 constitutes a sub-routine. A macro task graph MTG1_1_4 of the task MT1_1_4 of the sub-routine is composed of tasks MT1_1_4_1 to MT1_1_4_3 which have no variable element such as a condition branch having two pieces of parallelism in maximum. Since all of internal portions of the macro task MT1_1 have no element that varies process content during execution such as a condition branch, the scheduling step of the step S8 can be applied.

A macro task MT1_2 which is executable after the macro task MT1_1 has been completed is a macro task of 3 hierarchical layers. A macro task graph MTG1_2 of the task MT1_2 which is the macro task of a second hierarchical layer is composed of macro tasks MT1_2_1 to MT1_2_10 which have condition branches having two pieces of parallelism in maximum. Among these tasks, the task MT1_2_7 constitutes a sub-routine.

When a predetermined condition is established, the task MT1_2_1 of the second hierarchical layer executes the tasks MT1_2_3 and MT1_2_4 having two pieces of parallelism in parallel, whereas when the predetermined condition is not established, the task MT1_2_2 is processed. In the following description, such an example is represented that the predetermined condition is established, and the tasks MT1_2_3 and MT1_2_4 are executed.

A macro task graph MTG1_2_7 of the macro task MT1_2_4 of the sub-routine is composed of tasks MT1_2_7_1 to MT1_2_7_7 which have condition branches having two pieces of parallelism in maximum. When a predetermined condition is established, the task MT1_2_7_1 of a third hierarchical layer executes the tasks MT1_2_7_2 and MT1_2_7_3 having two pieces of parallelism in parallel, whereas when the predetermined condition is not established, the task MT1_2_7_4 is processed. In the following description, such an example is represented that the predetermined condition is established, and the tasks MT1_2_7_2 and MT1_2_7_3 are executed in parallel.

In the macro task MT1_2, since the second hierarchical layer and the third hierarchical layer have the condition branches, the dynamic scheduling (S9) is applied.

In this example, the condition branches are performed in the hierarchical manner in the hierarchical layers under the first hierarchical layer. As a result, the dynamic scheduling processings can be carried out in parallel, and the distributed dynamic scheduling processing is carried out in which the plurality of schedulers SC are executed in parallel.

Figure 12:
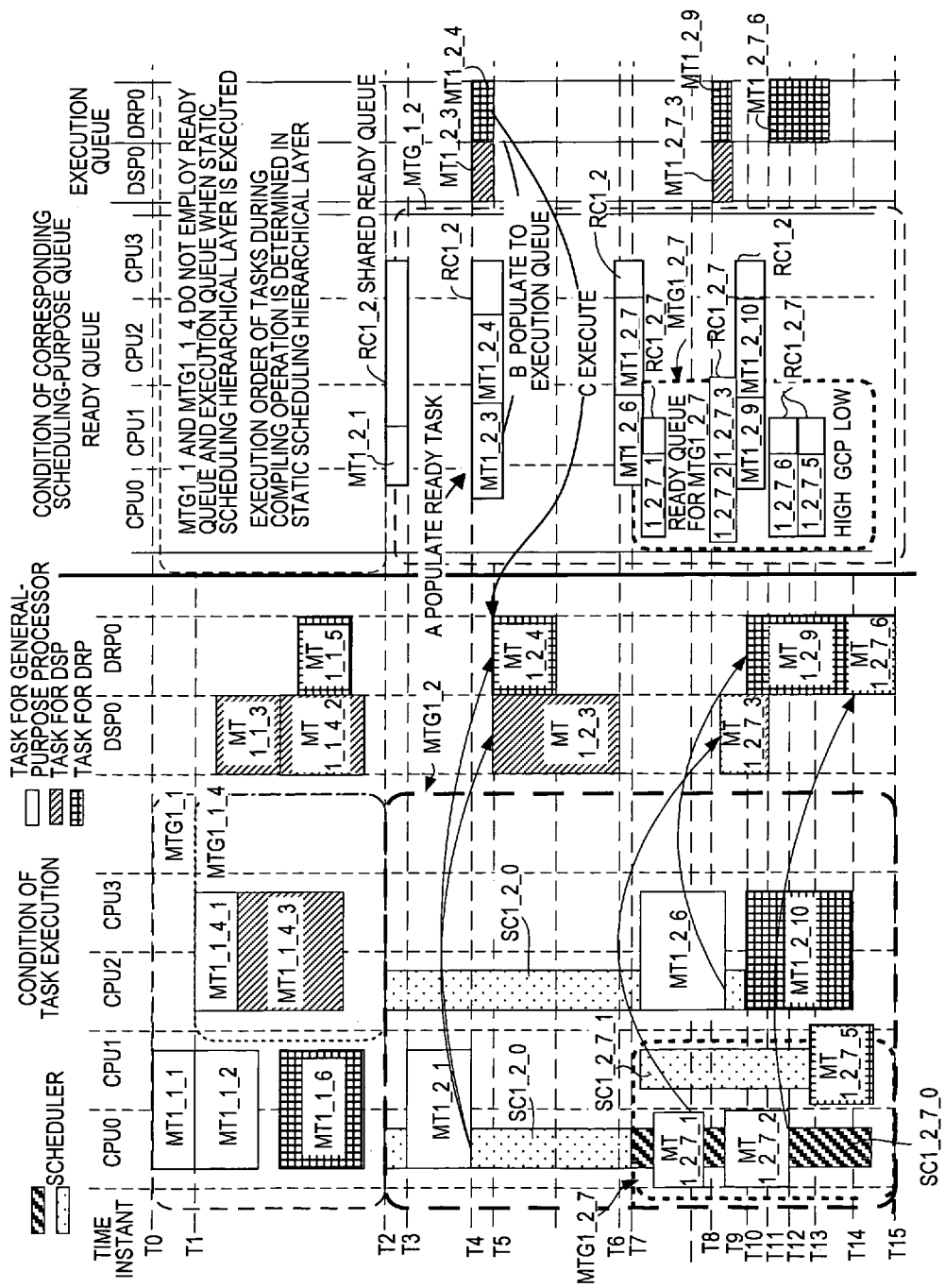
FIG. 12 is a time chart for showing a result obtained by executing a scheduling code obtained by compiling the input program of FIG. 11, and a relationship between queues and tasks executed by the respective processors according to the first embodiment of this invention.
Figure 16:
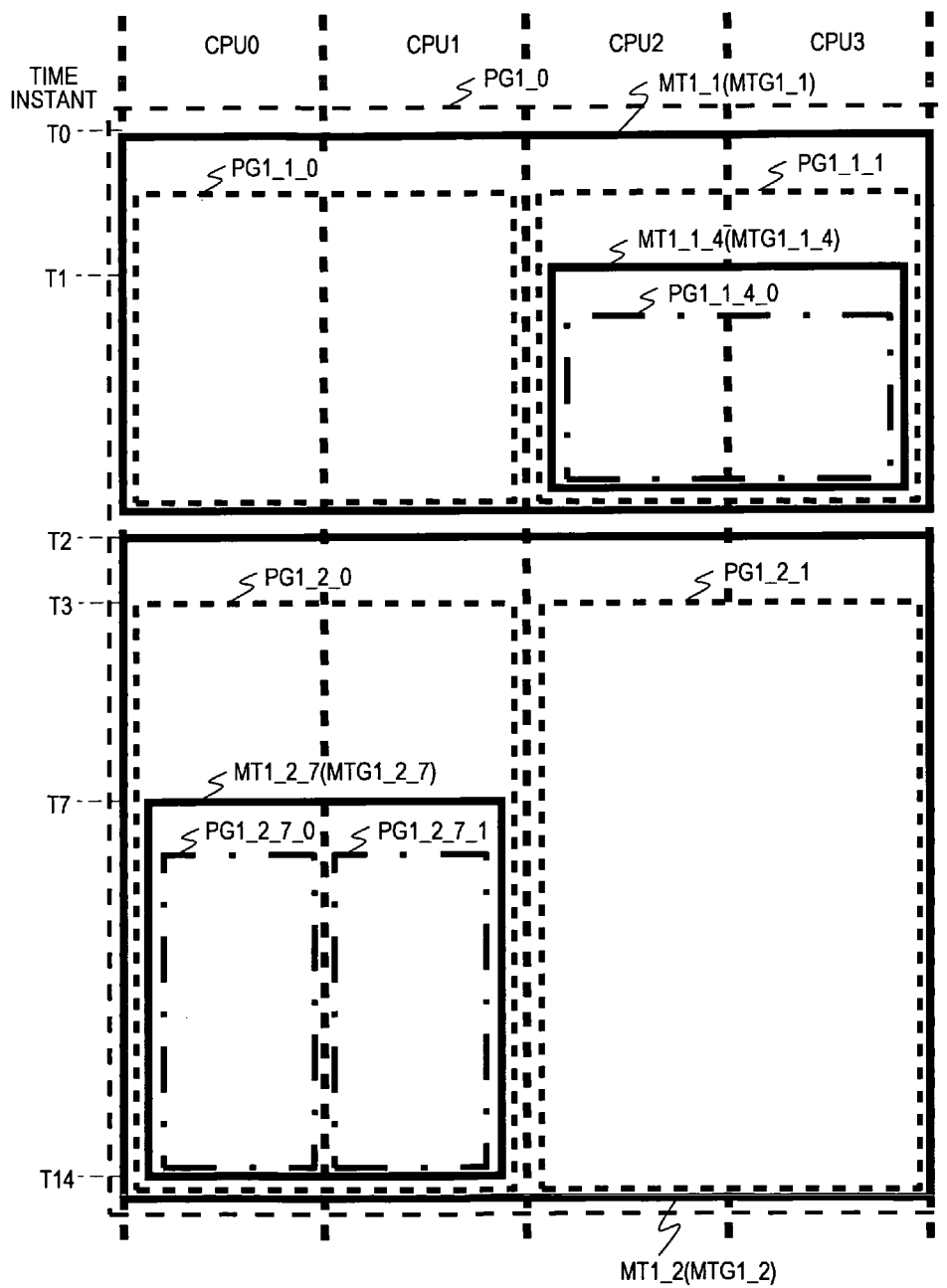
FIG. 16 is a time chart for showing a result obtained by executing a scheduling code obtained by compiling the input program of FIG. 11, and a relationship between processor groups and tasks according to the first embodiment of this invention.

FIGS. 12 and 16 show results obtained by executing output codes in such a manner that the input program 400 arranged by the macro task graph MTG1 shown in FIG. 11 is compiled by the compiler 40. That is, FIG. 12 indicates a time chart for representing a relationship between process time instants of the tasks MTs and the queues. FIG. 16 is a time chart for showing a relationship between process time instants of the tasks MTs and the processor groups. FIGS. 12 and 16 indicate an example where the output codes are executed by employing the four general-purpose processors CPU0 to CPU3, one DRP0, and one DSP0. An accelerator group is one configuration together with the DRP and the DSP. As to the general-purpose processor group, since a task holding upper limit number of execution queues is one, the execution queue of the general-purpose processor group of FIG. 12 is omitted.

At a time instant T0, the execution of the macro task graph MTG1 corresponding to the first hierarchical layer (equivalent to main program) is commenced. In this hierarchical layer, four general-purpose processors CPU constitute a single group (PG1-0), and the task MT1_1 is allocated to this group. At the same time, in such a hierarchical layer that the task of the macro task group MTG1_1 is executed according to the parallelism of MTG1_1 corresponding to the internal macro task graph of MT1_1, two sets of general-purpose processor groups, that is, a general-purpose processor group (PG1-1_0) including the CPU0 and CPU 1, and another general-purpose processor group (PG1-1_1) including the CPU2 and CPU3 are formed. At this time, the task MT1_1_1 is allocated to the general-purpose processor group PG1-1_0 to be executed by the static scheduling processing. At a time instant T1, the task MT1_1_2 is executed by the general-purpose processor group PG1-1_0, and the task MT1_1_4 of the sub-routine is allocated to the general purpose processor group PG1-1_1. In this case, since the task MT1_1_4 contains therein the macro task graph MTG1_14, the general-purpose processors CPU2 and CPU3 contained in the general-purpose processor group PG1-1_1 to which the task MT1_1_4 has been allocated are further grouped so as to be used as units for allocating tasks. In this example, while considering the internal parallelism of the macro task graph MTG1_1_4, a single general-purpose processor group (PG1-1_4_0) is formed by the CPU2 and the CPU3 which can be utilized within this macro task graph MTG1_1_4. In the MTG1_1_4, at a time instant T1, the task MT1_1_4_1 is executed on the PG1-1_4_0. Then, after the task MT1_1_4_1 is ended, the task MT1_1_4_3 for the DSP is executed by the general-purpose processor group PG1-1_4_0. In the DSP0, first of all, the task MT1_1_3 is executed, and thereafter, the task MT1_1_4_2 is executed. This reason is given as follows. That is, as a result of comparison between the priority GCP and an end time instant, the processing of the macro task graph MTG1_1A4 may be accomplished in an earlier stage by utilizing the general-purpose processor group PG1-1_4_0 which becomes idle rather than the processing of the task MT1_1_4_3 by the DSP0.

It should be noted that in this example, in the time period from the time instant T0 to the time instant T2, only the macro task graphs are executed to which the static scheduling processings are applied. As a result, these allocations have been statically determined during the compiling operation, and both the ready queue RC and the execution queue EC employed in the dynamic scheduling processing are not used.

At a time instant T2, similarly to the MT1_1, the MT1_2 within the macro task graph MTGL is allocated to the PG1-0 which is composed of four general-purpose processors CPUs and is executed. At this time, the MT1_2 has internally the macro task graph MTG1_2. The respective general-purpose processors contained in the PG1-0 are grouped to a general-purpose processor group (PG1-2-0) including the CPU0 and the CPU 1, and another general-purpose processor group (PG1-2-1) including the CPU2 and the CPU3, while considering the parallelism of this task graph MTG1_2, which constitute units of allocation and executions for the macro tasks. In this case, since the task graph MTG1_2 includes the condition branch, the dynamic scheduling processing for determining the allocation of the tasks during the execution is applied. More specifically, such a distributed dynamic scheduling processing that the respective processor groups execute the scheduling processing and the tasks has been selected due to the relationship between the parallelism and the total number of processors. In the CPU0 of the general-purpose processor group PG1-2-0, the scheduler SC1_2_0 is initiated, whereas in the CPU2 of the general-purpose processor group PG1-2-1, the scheduler SC1_2_1 is initiated in parallel therewith.

Also, the ready queue RC1_2 corresponding to the MTG1_2 is set on the centralized shared memory 18, and shared by the CPU0 to the CPU3 (PG1-2-0 and PG1-2-1). At the time instant T2, the scheduler SC1_2_0 populates the executable task MT1_2_1 to the ready queue RC12, and this task MT1_2_1 is allocated to the general-purpose processor group PG1-2-0 at a time instant T3 so as to be executed. It should be noted that with a time period from the time instant T2 to a time instant T7, as to macro tasks contained in MTG1_2, the scheduler SC1_2_0 performs the allocations to the PG1-2 and the accelerator group, and the scheduler SC1_2_1 performs the allocations to the PG1-2-1 and the accelerator group.

When the task MT1_2_1 is accomplished at a time instant T4, the condition branch result task MT1_2_3 and the task MT1_2_4 are populated to the ready queue RC1_2, and are sorted in the order of higher priority GCP. As to the two tasks, the MT1_2_3 corresponds to a task for the DSP, and the MT1_2_4 corresponds to a task for the DRP. Further, the accelerator group is under idle condition. As a result, the scheduler SC1_2_0 populates the task MT1_2_3 from the ready queue RC1_2 to the execution queue of the DSP0, and also populates the task MT1_2_4 to the execution queue of the DRP0.

When the processings (tasks MT1_2_3 and MT1_2_4) in two specific-purpose PEs are completed at a time instant T6, the scheduler SC1_2_1 populates both the task MT1_2_6 and the task MT1_2_7 of FIG. 11 to the ready queue RC12, and then, allocates the task MT1_2_6 to the processor group PG1-2-1 which handles this task, so this task MT1_2_6 is executed. Thereafter, the scheduler SC1_2_0 allocates the task MT1_2_7 to the processor group PG1-2-0. Since the task MT1_2_7 contains therein the macro task graph MTG1_2_7, while considering the parallelism thereof, the processor group PG1-2-0 which executes this macro task graph MTG1_2_7 is internally grouped into PG1-2-7-0 made of the CPU0, and PG1-2-7-1 made of the CPU 1 in a hierarchical manner, and then, the scheduler SC1_2_7_0 and the scheduler SC1_2_7_1 are initiated respectively in the grouped processors. Also, a ready queue RC1_2_7 for the macro task graph MTG1_2_7 is set to the centralized shared memory (CSM) 18, and is shared by the processor groups PG1-2-7-0 and PG1-2-7-1. Subsequently, in a time period from the time instant T7 to a time instant T14, the scheduler SC1_2_0 and the scheduler SC1_2_7_0 are present on the CPU0 at the same time. However, in a time period during which the tasks contained in the MTG1_2_7 are processed, the scheduler SC1_2_7_0 handles a control, at the time instant T14 when the processing of MTG1_2_7 is ended, the processing of the scheduler SC1 2_7_0 is ended, and then, the scheduler SC1_2_0 is again controlled. In the PG1-2-1 in which the control is not moved to hierarchical layers except for the MTG1_2, the scheduler SC1_2_1 handles the control during this time duration.

In the PG1-2-7-0, at the time instant T8, the processing of the task MT1_2_7_1 is accomplished, and a result of the condition branch is made. In this example, as a result of the condition branch, since the tasks MT1_2_7_2 and MT1_2_7_3 are executed, the scheduler SC1_2_7_0 populates the task MT1_2_7_2 directed to the general-purpose PE and the MT1_2_7_2_3 directed to the specific-purpose PE in the ready queue RC1_2_7.

Then, at a time instant T9, the scheduler SC1_2_7 populates the task MT1_2_7_2 directed to the general-purpose PE to the PG1-2-7-0, and allocates the task MT1_2_7_3 directed to the DSP to the DSP0 so as to execute the allocated task MT1_2_7_3.

At the time instant T9, since the scheduler SC1_2_1 accomplishes the task MT1_2_6 directed to the general purpose PE, the scheduler SC1_2_1 populates two tasks MT1_2_9 and MT1_2_10 directed to the DRP into the ready queue RC1_2. At this time, the scheduler SC1_2_1 compares two priorities GCPs with each other, and since the priority of the task MT1_2_9 is higher, the scheduler SC1_2_1 populates the task MT1_2_9 to a head of the ready queue RC1_2, and subsequently populates the task MT1_2_10. Then, at a time instant T10, the scheduler SC1_2_1 populates the task MT1_2_9 to the execution queue of the DRP0 so as to execute this task MT1_2_9 by the DRP0. If the next task MT1_2_10 is executed by the DRP0, the end time instant is delayed. As a result, the scheduler SC1 populates the task MT1_2_10 to the own processor group PG1-2-1 at the time instant T10 so as to execute the populated task MT1_2_10.

At a time instant T1 1, since the task MT1_2_7_3 directed to the DSP as to the macro task graph MTG1_2_7 is accomplished, the scheduler SC1_2_7_1 populates the task MT1_2_7_6 directed to the DRP, which becomes the ready task, to the ready queue RC1_2_7. In the DRP0, since the task MT1_2_9 allocated by another scheduler SC1_2_1 has been executed, when this task is allocated to the DRP0, this DRP0 waits in the execution queue until this task MT1_2_9 is accomplished. Even though this waiting operation is considered, the scheduler SC 1_2_71 judges that the task MT1_2_7_6 is to be executed by the DRP0 to achieve a higher efficiency, and thus, populates the task MT1_2_7_6 to the execution queue of the DRP0.

At a time instant T12, since the task MT1_2_7_2 directed to the general-purpose PE as to the macro task graph MTG1_2_7 is completed, the scheduler SC1 2_7_0 populates the MT1_2_7_5 which becomes executable into the ready queue RC1_2_7. In the DRP0, the task MT1_2_9 allocated by another scheduler SC 1_2_1 is being executed, and further, the task MT1_2_7_6 is under a waiting status in the execution queue. Considering these statuses, this scheduler SC1_2_7_1 estimates an end time instant of the task MT1_2_7_5 directed to the DRP, and allocates the task MT1_2_7_5 directed to the DRP to the own processor group PG1-2-7-1, and then, commences the execution from a time instant T13.

On the other hand, the task MT1_2_7_6 which has been brought into the waiting status in the execution queue of the DRP0 is executed at a time instant T14, and then, is accomplished at a time instant T15, so all of the tasks MTs are completed.

As previously described, in the macro task graphs MTG1_2 and MTG1_2_7 which contain the condition branches, the distributed dynamic scheduling processing is carried out in which the plurality of schedulers are executed in parallel on the respective general-purpose processor groups PGs. Then, in this invention, since the general-purpose processor groups PGs and the accelerator groups are independently handled, the allocations of the tasks to the accelerator groups can be carried out by the plurality of general-purpose processor groups PGs. As a result, it is possible to avoid that the utilization of the accelerator groups is biased among the general-purpose processor groups PGs, and thus, the effective use of the resources can be realized. Further, the respective schedulers SCs can refer to the information as to the tasks of other hierarchical layers. Accordingly, the priority levels can be smoothly arbitrated among the respective hierarchical layers, and therefore, the process speed of the entire system can be improved.

In the above-mentioned static scheduling processing, such an example has been described in which the tasks are allocated to the respective PEs in a static manner. Alternatively, static scheduling codes may be produced by executing the static scheduling processing. In this alternative case, the accelerator core may properly acquire a task from an execution queue to execute the acquired task, while the execution queue holds tasks which have been previously populated in a sequential order of processings scheduled in advance when the processing is commenced.

In the above-mentioned example, the schedulers which are different from each other in the respective hierarchical layers have been utilized. Alternatively, in the case where, when a processing is moved to a lower grade hierarchical layer, a scheduler is continuously operated on the same processor, such a technique may be adopted. That is, a scheduler used in an upper grade hierarchical layer may be continuously utilized.

Further, in the above-mentioned example, the upper limit number of the execution queues corresponding to the general-purpose processor groups PGs has been selected to be one. Alternatively, similarly to the accelerator group, the upper limit number may be selected to be a plural number, so a preceding allocation and preloading of data may also be set with respect to the general-purpose processor groups PGs.

(Second Embodiment)

Figure 13:
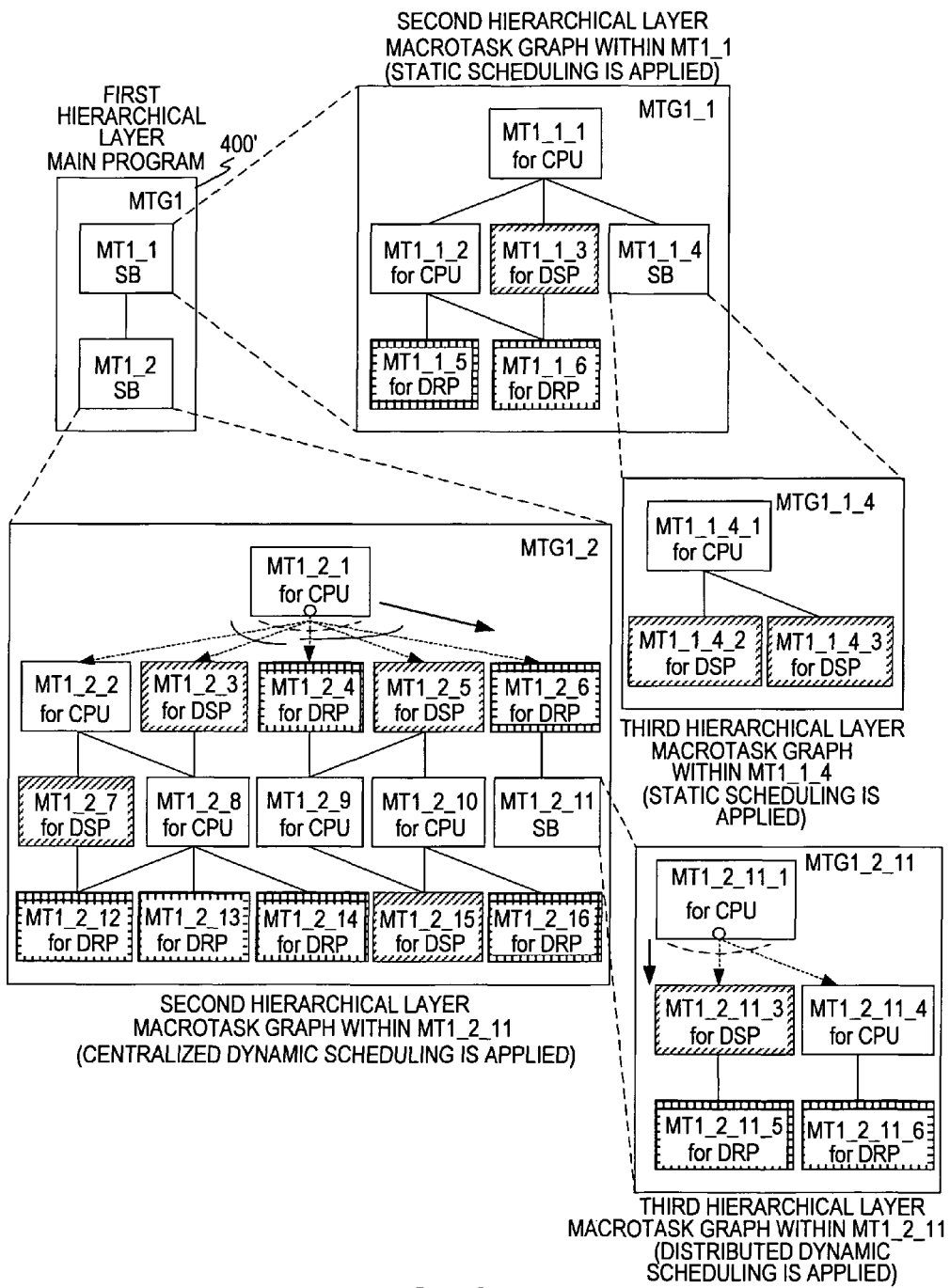
FIG. 13 is a macro task graph for showing a depending relationship among tasks produced by a compiler which analyzes another input program according to a second embodiment of this invention.
Figure 14:
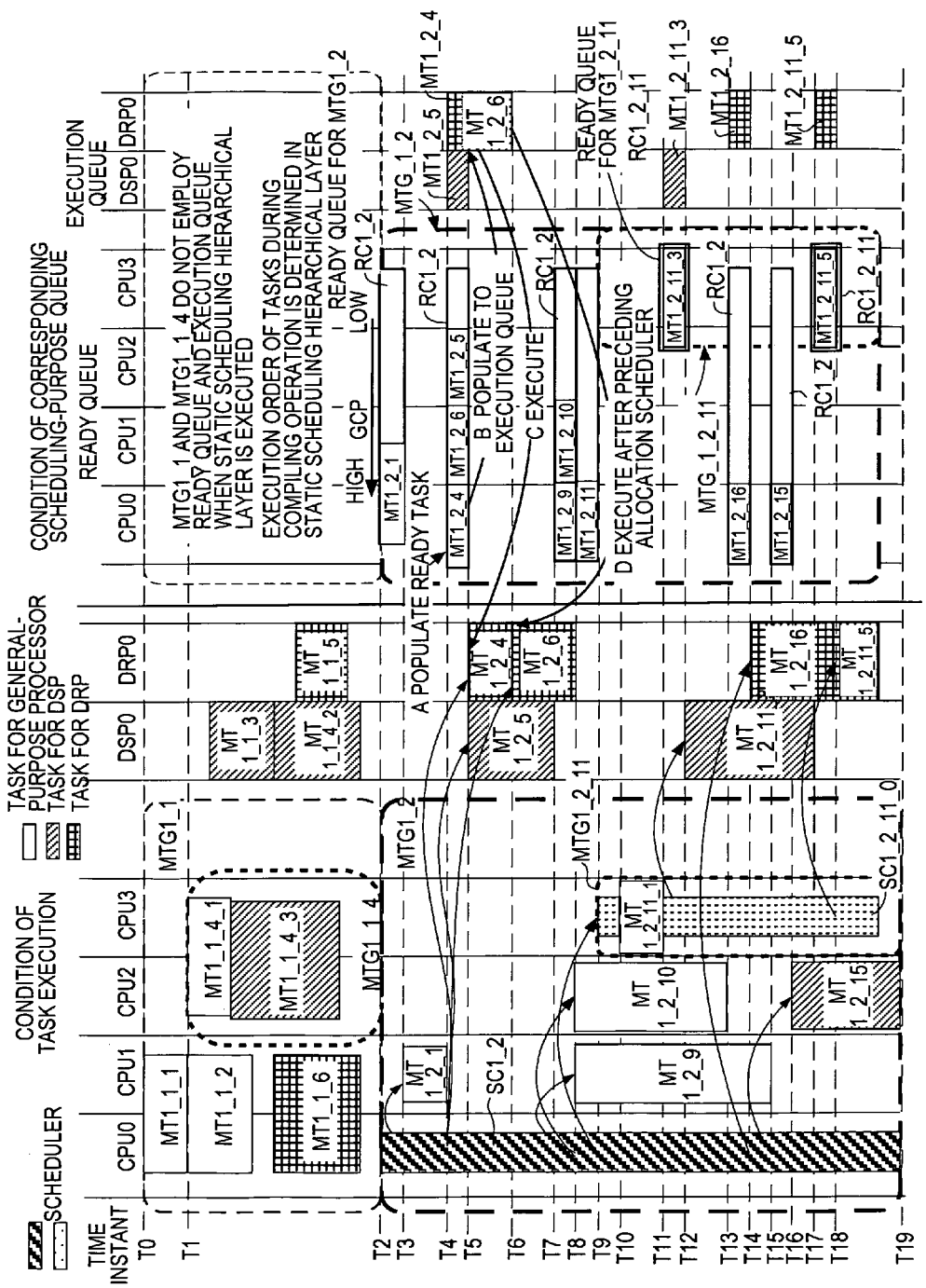
FIG. 14 is a time chart for showing a result obtained by executing a scheduling code obtained by compiling the input program of FIG. 13, and a relationship between queues and tasks executed by respective processors according to the second embodiment of this invention.
Figure 17:
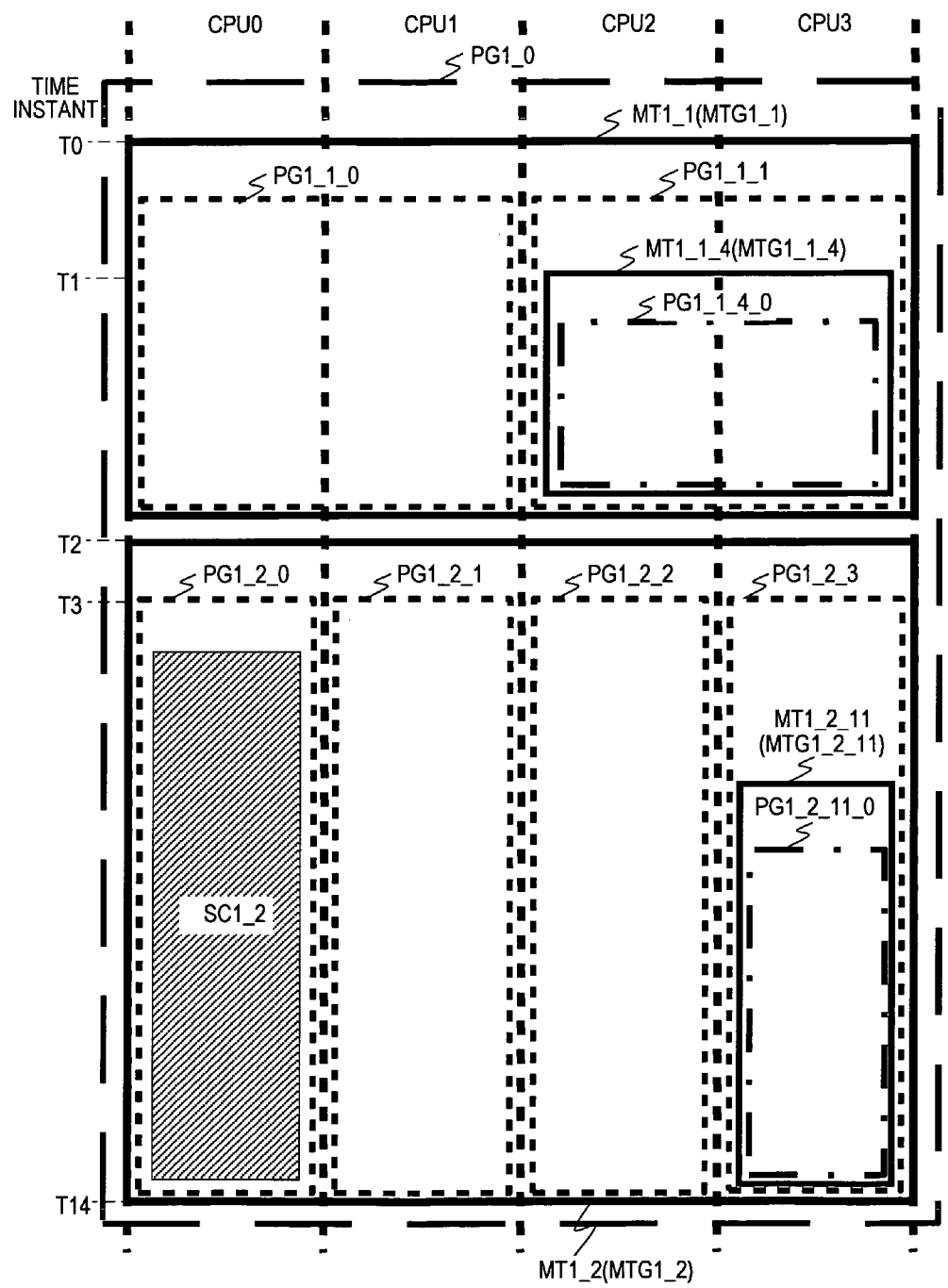
FIG. 17 is a time chart for showing a result obtained by executing a scheduling code obtained by compiling the input program of FIG. 13, and a relationship between processor groups and tasks according to the second embodiment of this invention.

FIGS. 13, 14, and 17 show a second embodiment of this invention, and exemplify an example where a distributed/centralized dynamic scheduling processing is applied. In this dynamic scheduling processing, a dynamic scheduling code thereof is mainly processed by a single general-purpose PE. In this second embodiment, the general-purpose PE which executes the scheduling code is statically described, and other configurations thereof are similar to those of the above-mentioned first embodiment.

FIG. 13 shows an example of a macro task graph which is entered as the input program 400', in the compiler 40 to be produced.

As a result of analyzing the input program 400' by the compiler 40, as shown in FIG. 13, the macro task graph MTG1 of the input program 400' is divided into two macro tasks MT1_1 and MT1_2 in such a manner that these macro tasks MT1_1 and MT1_2 are sequentially processed. It should be noted that representations in this drawing are similar to those of FIG. 2. Also, hatching of inclined lines in this drawing indicates tasks directed to DSPs, whereas hatching of cross lines shows tasks directed to DRPs. In this drawing, tasks having no hatching indicate tasks directed to general purpose processor DPUs.

The macro tasks MT1_1 and MT1_2 constitute sub-routines. The macro task MT1_1 constitutes macro tasks of 3 hierarchical layers. A macro task graph MTGL_1 of the macro task MT1_1 is composed of tasks MT1_1_1 to MT1_1_6 which have no variable element such as a condition branch having three pieces of parallelism in maximum. Among these tasks, the task MT1_1_4 constitutes a sub-routine. A macro task graph MTG1_1_4 of the task. MT1_1_4 of the sub-routine is composed of tasks MT1_1_4_1 to MT1_1_4_3 which have no variable element such as a condition branch having two pieces of parallelism in maximum. Since all of internal portions of the macro task MT1_1 have no element that varies process content during execution such as a condition branch, the scheduling step of the step S8 can be applied.

A macro task MT1_2 which is executable after the macro task MT1_1 has been completed is a macro task of 3 hierarchical layers. A macro task graph MTG1_2 of the task MT1_2 which is the macro task of a second hierarchical layer is composed of macro tasks MT1_2_1 to MT1_2_16 which have condition branches having three pieces of parallelism in maximum. Among these tasks, the task MT1_2_11 constitutes a sub-routine.

When a predetermined condition is established, the task MT1_2_1 of the second hierarchical layer executes the tasks MT1_2_4, MT1_2_5, and MT1_2_6 having three pieces of parallelism in parallel, whereas when the predetermined condition is not established, the tasks MT1_2_2 and MT1_2_3 are processed in parallel. In the following description, such an example is represented that the predetermined condition is established, and the tasks MT1_2_4, MT1_2_5, and MT1_2_6 are executed.

After the condition branch has been determined in the task MT1_2_1, the respective tasks MTs are sequentially executed according to depending characteristics indicated by solid lines of the drawing.

The macro task graph MTG1_2_7 of the task MT1_2_11 of the sub-routine of the second hierarchical layer is composed of tasks MTs which are separately executed after the condition branch. When a predetermined condition is established, the macro task graph MTG1_2_11_1 of the third hierarchical layer executes a task MT1_2_11_3, whereas when the predetermined condition is not established, the macro task graph MTG1_2_11_1 of the third hierarchical layer executes a task MT1_2_11_4. In the following description, such an example is shown that the predetermined condition is established and the task MT1_2_11_3 is executed.

In the macro task MT1_2, since condition branches are present in the second hierarchical layer and the third hierarchical layer, a dynamic scheduling step (S9) is applied.

In this example, since the condition branches are carried out in a hierarchical manner in the hierarchical layers under the first hierarchical layer, the dynamic scheduling processings can be carried out in parallel. The tasks are allocated by a single scheduler SC in a concentrated manner. In the condition branch of the third hierarchical layer, the tasks are allocated by a new scheduler.

FIGS. 14 and 17 show results obtained by executing output codes are executed in such a manner that the input program 400' arranged by the macro task graph MTG1 shown in FIG. 13 is compiled by the compiler 40. That is, FIG. 14 indicates a time chart for representing a relationship between process time instants of the tasks MTs and the queues. FIG. 17 is a time chart for showing a relationship between process time instants of the tasks MTs and the processor groups. FIGS. 14 and 17 indicate an example where the output codes are executed by employing four general-purpose processors CPU0 to CPU3, one DRP0, and one DSP0. An accelerator group is one configuration together with the DRP and the DSP. As to the general-purpose processor group, since a task holding upper limit number of execution queues is one, the execution queue of the general-purpose processor group of FIG. 14 is omitted.

In FIGS. 14 and 17, in a time period from a time instant T0 to a time instant T2, similarly to FIGS. 12 and 16, a static scheduling processing is applied so as to execute tasks in a static manner in a general-purpose processor group PG1-0 corresponding to the main hierarchical layer, PG1-4-0 and an accelerator group, which are defined in a hierarchical manner with the general-purpose processor group PG1-1-1, and also, the two general-purpose processor groups PG1-1-0 and PG1-1-1, which are grouped in a hierarchical manner within the above-mentioned general-purpose processor group PG1-0. Similarly to FIGS. 12 and 16, during a time period of the static scheduling operation, a ready queue RC and an execution queue EC are not utilized, but the tasks allocated to the respective PEs in a static manner are executed.

At the time instant T2, a processing within the macro task graph MTG1_2 is commenced. The general-purpose processor group (PG1-0) contains four general-purpose processors, to which the macro task MT1_2 containing the macro task graph MTG1_2 has been applied. While considering parallelism inside the macro task graph MTG1_2 and a total number of the processors thereof, the centralized dynamic scheduling processing is selected for scheduling any one of these four general-purpose processors, and one of these general-purpose processors forms a single general-purpose processor group. In this example, the CPU0 constitutes a general-purpose processor group PG1-2-0, the CPU 1 forms a general-purpose processor group PG1-2-1, the CPU2 constitutes a PG1-2-2, and the CPU3 forms a PG1-2-3. Also, a ready queue RC1_2 is set on the local memory (LM) 22 of the PG1-2-0 where the centralized dynamic scheduler SC1_2 is operated. In the distributed dynamic scheduling processing of FIGS. 12 and 16, the ready queue RC1_2 is set to the centralized shared memory (CSM) 18, whereas in this distributed/centralized dynamic scheduling processing, the ready queue RC is set to the local memory 22 of the CPU0 where the scheduler SC1_2 for unifying the scheduling processings is operated, resulting in a technical different point.

At a time instant T2, the scheduler SC1_2 populates the task MT1_2_1 having the highest priority GCP in the ready queue RC12, and allocates this task MT1_2_1 to the general-purpose processor group PG1-2-1 from a time instant T3.

At a time instant T4, the task MT1_2_1 containing the condition branch is accomplished. Based on the result of the condition branch, the scheduler SC1_2 populates three tasks, that is, a task MT1_2_4, a task MT1_2_5, and a task MT1_2_6, of the macro task graph MTG1_2 shown in FIG. 13 to the ready queue RC1_2, and sorts these tasks in the order of higher priority GCP. Among these three tasks, the MT1_2_5 is a task directed to the DSP, and the MT1_2_4 and the MT1_2_6 are tasks directed to the DRP. The scheduler SC 12 rearranges the task MT1_2_4 at a head (priority value=high) of the ready queue RC 1_2 based on the priority GCP of the respective tasks MTs and end time instants, and sets a process order of the task MT1_2_5 to a final process order.

At this time instant T4, since the accelerator group is under an idle status, the scheduler SC1_2 populates the task MT1_2_5 to the execution queue of the DSP0, populates the task MT1_2_4 to the execution queue of the DRP0, and thereafter, populates the task MT1_2_6 to the execution queue of the DRP0. At this time instant T4, since the three general-purpose processor groups PG1-2-1 to PG1-2-2 are under an idle status, the scheduler SC1_2 can allocate the task MT 1_2_6 for the DRP to these processor groups PG1-2-1 to PG1-2-2. However, the scheduler SC 12 estimates that even though the scheduler SC1_2 is brought into a waiting status until the task MT1_2_4 is accomplished, if the task MT1_2_6 is executed by the DRP0, then an end time instant of the entire system may become shorter, so the scheduler SC1_2 allocates the task MT1_2_6 to the DRP0 in advance.

At a time instant T5, each of the specific-purpose PEs of the accelerator group acquires a task of an execution queue, and executes the acquired task. When the DRP0 completes the task MT1_2_4 at a time instant T6, the DRP0 starts to execute the task MT1_2_6 under a waiting status in the execution queue.

At a time instant T7, the DSP0 completes the task MT1_2_5. The scheduler SC1_2 detects that the task, MT1_2_9 and MT1_2_10 following the task MT1_2_5 can be executed from the data depending information in the macro task graph MTG1_2 of FIG. 13. Then, at this time instant T7, the scheduler SC12 populates these 2 tasks MT1_2_9 and MT1_2_10 to the ready queue RC1_2. Since these two tasks MT1_2_9 and MT1_2_10 correspond to such tasks directed to the general-purpose processor, at a time instant T8, the scheduler SC1_2 allocates the task MT1_2_9 to the general-purpose processor group PG1-2-1, and also allocates the task MT1_2_10 to the PG1-2-2 so as to execute these tasks.

On the other hand, at the time instant T8, the task MT1_2_6 is accomplished in the DRP0, whereby the scheduler SC1_2 populates a task MT1_2_11 corresponding to the sub-routine from the macro task graph MTG1_2 shown in FIGS. 12 and 16 to the ready queue RC1_2, and allocates this task to the processor group PG1-2-3 under an idle status. At this time, the task MT1_2_11 contains such a macro task graph MTG1_2_11 which includes therein a condition branch. However, in a general-purpose processor which constitutes the processor group PG1-2-3, because of the CPU3 being only one CPU and the internal configuration of the macro task graph MTG1_2_11, the CPU3 contained in the processor group PG1-2-3 constitutes a general-purpose processor group PG1-2-11-0, and such a distributed dynamic scheduling processing is applied in which a general-purpose processor alternately executes a scheduling processing and a task. Also, a scheduler SC1_2_2_11_0 is initiated by the CPU3, and then, a ready queue RC1_2_11 is set to the distributed shared memory (DSM) 23. In this example, although only one PG is merely present in a hierarchical layer for executing the macro task graph MTG1_2_11, when a plurality of PGs are contained in the hierarchical layer, the ready queue RC1_2_11 is commonly used within the PGs of this hierarchical layer.

Then, at a time instant T9, the scheduler SC2_1_1_0 populates the task MT1_2_11_1 to the ready queue RC1_2_11. Since this task MT1_2_11_1 corresponds to such a task directed to the general-purpose processor, the scheduler SC1_2_11_0 allocates this task to the processor group PG1_2_11_0 at a time instant T10 so as to execute this allocated task.

At a time instant T11, the task MT1_2_11_1 allocated to the PG1-2-11-0 is accomplished, and as a result of the condition branch shown in FIG. 13, the processing is branched to a task MT1_2_11_3 for the DSP. The scheduler SC1_2_11_0 populates the task MT1_2_11_3 for the DSP to the ready queue RC1_2_11. Then, at a time instant T12, the scheduler SC1_2_11_0 populates the task MT1_2_11_3 to the execution queue of the DSP0 so as to execute the populated task.

At a time instant T13, the task MT1_2_10 of the processor group PG1-2-2 is accomplished. At this time, since the task MT1_2_9 of the processor group PG1-2-1 is yet to be completed, the scheduler SC1_2_0 is capable of executing only the task MT1_2_16 for the DRP due to the data depending relationship of the macro task graph MTG1_2 of FIG. 13. As a result, the scheduler SC1_2_0 populates this task MT1_2_16 to the ready queue RC1_2, and causes the DRP0 to execute the populated task at a time instant T14.

At a time instant T15, the task MT1_2_9 of the processor group PG1-2-1 is accomplished, and the scheduler SC1_2 is capable of executing only the task MT1_2_15 for the DRP due to the data depending relationship of the macro task graph MTG1_2 of FIG. 13. As a result, the scheduler SC1_2 populates this task MT1_2_15 for the DRP to the ready queue RC1_2. At this time, since the DRP0 is executing the task of the scheduler SC1_2_11_0, the scheduler SC1_2 allocates the task MT1_2_15 for the DRP to the general-purpose processor PG1-2-2 so as to execute the allocated task at a time instant T16, as a result of an estimation of an end time instant.

At a time instant T17, since the task MT1_2_11_3 of the DSP0 is completed, the scheduler SC1_2_110 for processing the macro task graph MTG1_2_11 populates the task MT1_2_11_5 for the DRP to the ready queue RC1_2_11. At this time, the DRP0 is executing the task MT1_2_16 of the scheduler SC1_2. However, the scheduler SC1_2_1 1_0 judges that waiting of the scheduler SC1_2_11_0 until the execution by the DRP0 is completed makes an end time instant earlier than another end time instant when the task MT1_2_11_5 is executed by the general-purpose processor PG1-2-1 1-0, and thus, populates the task MT1_2_11_5 to the execution queue of the DRP0.

At a time instant T18, the DRP0 accomplishes the task MT1_2_16 of the scheduler SC1_2, and executes the task MT1_2_11_5 of the scheduler SC1_2_11_0 present in the execution queue.

At a time instant T19, all of the processings are accomplished.

It should be noted that for a time period from the time instant T9 to the time instant T19, as viewed from the scheduler SC1_2, the processor group PG1-2-3 is executing the task MT1_2_11, during which an allocation from the scheduler SC1_2 is not carried out with respect to the processor group PG1-2-3. After the execution of the task MT1_2_11 (namely, macro task graph MTG1_2_11) has been accomplished, the processor group PG1-2-3 again becomes such a processor group to which a task is allocated from the scheduler SC1_2.

In this example, the CPU0 which executes the scheduler SC1_2 in the macro task graph MTG1_2 performs the scheduling processing without performing the processing of the task. Alternatively, the CPU0 may execute a task processing while the CPU0 is performing the scheduling processing, depending on a shape of a macro task graph and a load condition. Further, since there is no need to commonly use another scheduler and the ready queue RC1_2, the ready queue RC12 may be set to the local memory (LM) 22 of the CPU0 which executes the scheduler SC1_2 in order to lower the latency, so the processing may be carried out at a high speed.

Also, in the case where a centralized dynamic scheduling processing is applied to a hierarchical layer which is lower than such a hierarchical layer to which the centralized dynamic scheduling processing has been applied, a scheduler of the lower grade hierarchical layer may be alternatively operated on a processor where a scheduler has been operated in an upper grade hierarchical layer. As a consequence, there is no such a useless work that the processors are allocated to the scheduling processings, and thus, the processors may be effectively utilized in the respective hierarchical layers.

It should be noted that FIGS. 12, 14, and 17 have exemplified an example where in view of the configuration of the macro task graph MTG, the dynamic scheduling processing is carried out after the static scheduling processing is performed. Alternatively, in a case where a configuration of a macro task graph MTG is capable of executing both the static scheduling processing and the dynamic scheduling processing in parallel, the respective scheduling processings may be executed by a plurality of general-purpose processor groups PGs.

(Third Embodiment)

Figure 15:
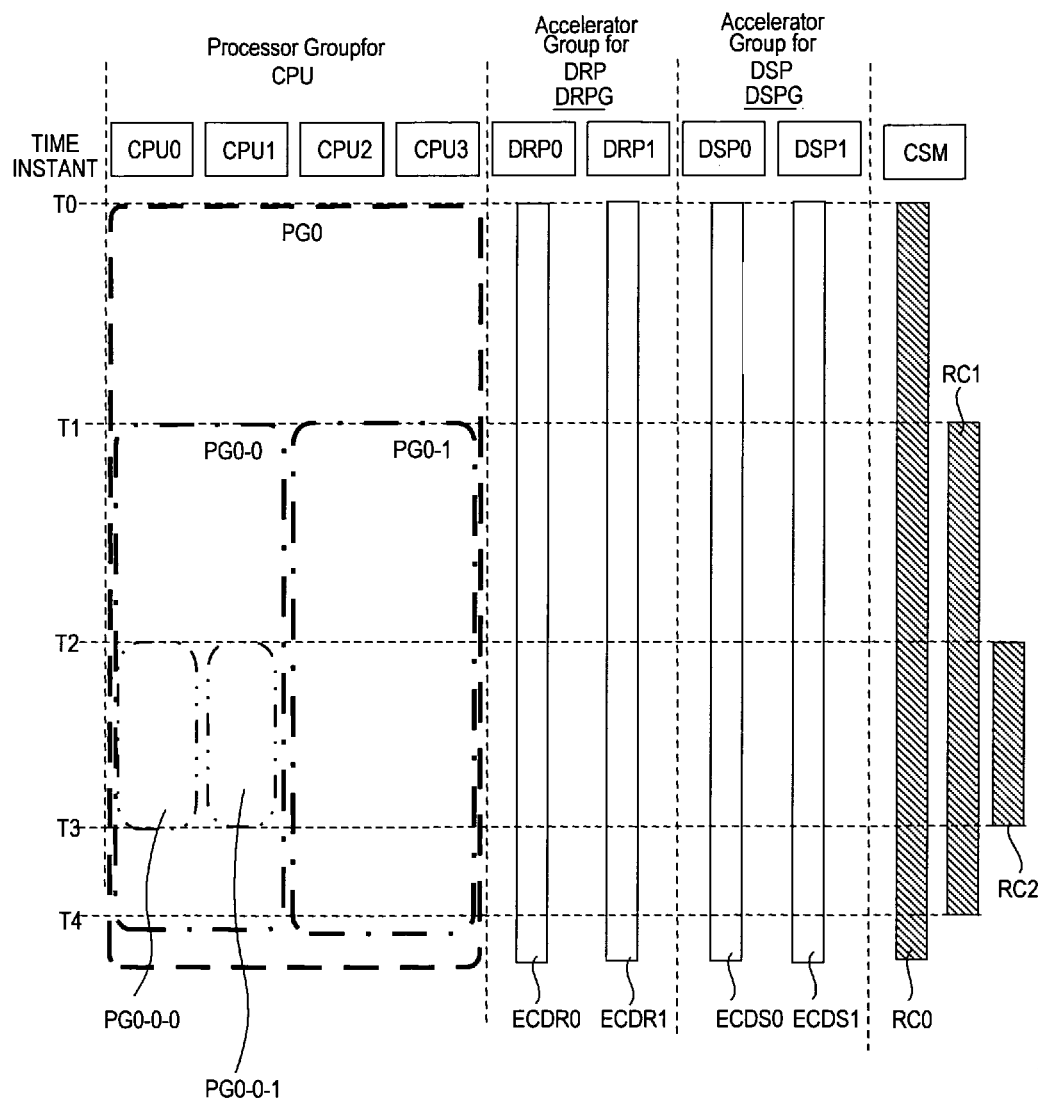
FIG. 15 is an explanatory diagram for showing a status of queues of a processor system according to a third embodiment of this invention.

FIG. 15 indicates a processor system according to a third embodiment of this invention, in which an execution queue of the accelerator group according to the first embodiment is set for each of the specific-purpose PEs, and other configurations thereof are made similar to those of the first embodiment.

In FIG. 8 of the first embodiment, such an example has been described that while a group is set for each sort of the specific-purpose PEs of the accelerator group, one execution queue is set with respect to each of these groups. Alternatively, as shown in FIG. 15, an execution queue may be provided every specific-purpose PE of the accelerator group.

In other words, the accelerator group may constitute a DSP group DSPG and a DRP group DRPG every sort of the specific-purpose PE. Execution queues ECDS0 and ECDS1 may be provided within the DSP group DSPG with respect to a distributed shared memory 23 of each of the DSP0 and the DSP1. Execution queues ECDR0 and ECDR1 may be provided within the DRP group DRPG with respect to a distributed shared memory 23 of each of the DRP0 and the DRP1.

In this case, when a scheduler SC of a general-purpose processor group PG estimates a process cost and the like, this scheduler SC performs the estimation in the unit of each group of the accelerator group. When the scheduler SC actually allocates a task, this scheduler SC populates the task to the execution queue of each of the specific-purpose PEs. Also, in this case, when a scheduling processing is carried out, the general-purpose processor group PG considers the allocation of the task every sort of the accelerator group. As a result, similarly to the above-mentioned example, a specific-purpose PE can be shared by the plurality of general-purpose processor groups PGs, and thus, it is possible to avoid that resources of the specific-purpose PEs are in short.

Also, in the above-mentioned first and second embodiments, grouping of the general-purpose processors in each of the hierarchical layers is equally divided, but this invention is not limited only to this group division. Alternatively, the general-purpose processors may be unequally grouped according to a shape of a macro task graph, a cost of each of macro tasks, or a load condition. Even in such an alternative case, a task scheduling processing may be effectively carried out by employing a similar scheduling method.

(Fourth Embodiment)

Figure 18:
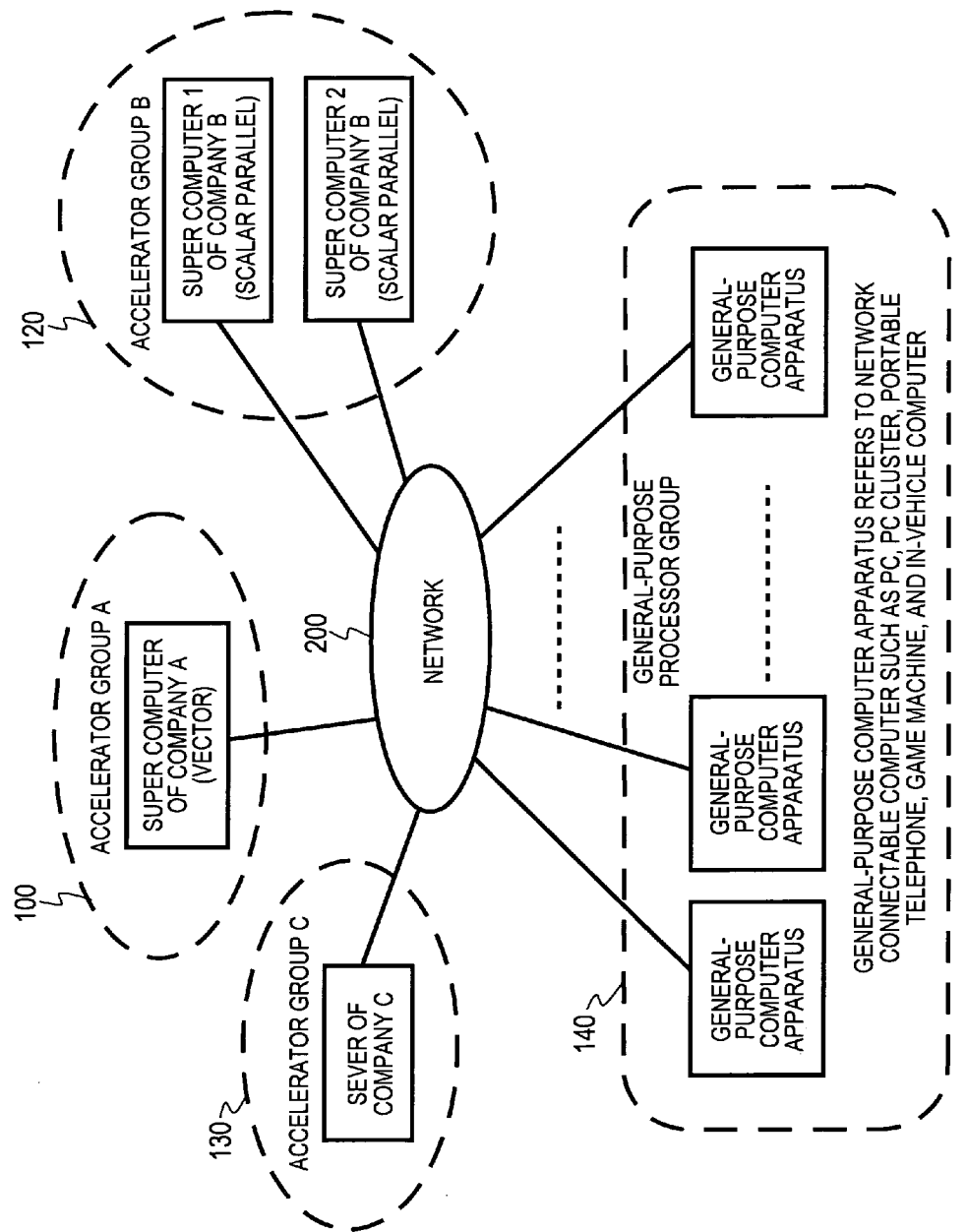
FIG. 18 is a block diagram for showing GRID computing composed of heterogeneous computer groups according to a fourth embodiment of this invention.

FIG. 18 is a block diagram for showing a fourth embodiment of this invention, that is, an example in which the scheduling method of the first, second, or third embodiment is applied to GRID computing. In FIG. 18, computers such as various sorts of super computers, a server, and PCs are connected via a network 200. Under such a heterogeneous distributed environment, the respective computer resources are grouped as either general-purpose processors or accelerators to be defined according to functions thereof and characteristics thereof, so the above-mentioned scheduling methods may be applied.

In FIG. 18, for instance, a super computer manufactured by a firm "A" is defined as an accelerator group A (110), each of two super computers manufactured by a firm "B" is defined as an accelerator group B (120), and also, a server manufactured by a firm "C" is defined as an accelerator group C (130). Also, general-purpose computer apparatuses connectable to the network 200, for instance, PC clusters and PCs are grouped as a general-purpose processor group 140. The respective computers contained in this general-purpose processor group 140 constitute subject computers to be grouped in a hierarchical manner. Since the respective groups are defined in the above-mentioned manner, the above-mentioned scheduling methods can be applied. Since the respective accelerator groups A to C and the general-purpose processor groups correspond to computers which execute instruction sets different with each other, and are handled similarly to the general-purpose processor groups and the accelerator groups of the first to third embodiments, this invention can be applied to such a GRID computing that the accelerator groups A to C and the general-purpose processor groups are connected with each other using the network 200 so as to distribute processings.

It should be noted that the grouping of the accelerator groups and the general-purpose processor groups need not be defined as described with reference to FIG. 18, but may be properly changed according to contents of processings and functions/characteristics of the respective computers. For instance, in FIG. 18, the general-purpose processor groups also include game machines and the like. Alternatively, when programs containing a large number of contents which can be processed at a high speed by game machines are executed, a group of these game machines may be defined as an accelerator group independently provided with the general-purpose processor group.

(Conclusion)

As previously described, according to the respective embodiments of this invention, in the multiprocessor system for accumulating various sorts of processor elements PEs, due to the arrangement in a divisional manner of the programs for operating these processor elements PEs in a high efficiency, and the compiler 40 for producing the control codes, while the performance of the multiprocessor system can be utilized at maximum, the processing can be performed in a higher efficiency with low power consumption within a minimum processing time.

In other words, the static scheduling for previously determining the task allocation is applied to the tasks whose execution sequence can be fixed when these tasks are compiled by the compiler 40. On the other hand, the dynamic scheduling method of determining the task allocation during execution is applied to the tasks containing the undefined elements such as the condition branches. As a result, the overhead as to the processings required in the scheduling can be suppressed.

Also, in the above-mentioned respective embodiments, while the general-purpose processor group and the accelerators are divided as separate groups every sort thereof, the selecting processing for selecting whether the specific-purpose PE of the accelerator group, or the general-purpose processor is employed which are designated every task when the task is allocated is determined based on the cost information (CP length) and the operation conditions of the accelerators, which are acquired during compiling operation. Accordingly, even though the sort and the quantity of accelerators are increased, the costs required in the scheduling processings are not increased. As a consequence, even in a case where total numbers of the general-purpose PEs and the specific-purpose PEs in the heterogeneous multiprocessor system are increased, it is possible to avoid that the overhead of the scheduling processings is increased.

That is, in case of the static scheduling method, while the virtual ready queue is used in the scheduler during the compiling operation, the tasks are allocated to the general-purpose processor group and the accelerator group based on the predicted earliest end time instants. Then, according to the task allocation, the task codes having the instruction set for each of the processor groups are arranged in the order allocated to the respective processors, and the execution code as the object code is outputted.

In the dynamic scheduling processing, the task code is loaded on such a processor having a possibility of executing this task. The dynamic scheduling codes (scheduler SC) are executed which have been embedded by the compiler every time each of the task executions is accomplished to detect that which task is executable (ready: earliest executable condition is satisfied). The ready task is populated to the ready queue. Then, the scheduler SC selects such a task having the highest priority value (namely, longest priority GCP length) on the ready queue as a task to be executed. Then, the scheduler SC calculates the predicted earliest end time instant in a case where the selected task is allocated to the executable processor group for each of these groups. The calculation of this earliest end time instant is executed every sort of the processor groups, or for each of plural processors when sorts of these processors are equal to each other.

Then, the scheduler SC allocates the selected task to such a PE (namely, PE having predicted earliest end time instant) which may probably accomplish a task execution. In other words, the scheduler SC populates the selected task to the execution queue for each of the processor groups.

With execution of the above-mentioned processing, the static scheduling processing and the dynamic scheduling processing can be automatically selected based on the configuration of the task contained in the macro task graph, and the execution code (task code) and the scheduling code are produced every task.

In the first embodiment, since the distributed dynamic scheduling processing is employed, the general-purpose PEs are not occupied for the scheduling processing. As a result, the resources of the general-purpose processor group PG can be used without wasting resources, so the process speed can be fastened.

Also, in the respective embodiments, the compiler 40 previously estimates the execution cycle time of the task, and adds the estimated cycle time to the own execution time of the task. The compiler 40 acquires the process priority GCP values of the tasks based on the critical path lengths of the entire task, and then, the compiler 40 actually allocates the tasks based on the sequence of the acquired priority GCP values in the scheduling processing. Accordingly, the execution sequence of the tasks is determined based on the process costs and the priority GCP values. Therefore, the parallel processing speed can be fastened while the resources of the heterogeneous multiprocessor system are effectively utilized. Further, the process costs and the priority GCP values are previously acquired when the compiling operation is executed, so the overhead required for execution of the scheduling processing can be suppressed.

In each of the above-mentioned first to fourth embodiments, this invention has been applied to the multiprocessor system including the plurality of PEs 10 to 17 on a single chip. Alternatively, this invention may be applied to such a parallel computer including plural sets of the heterogeneous multiprocessor system shown in FIG. 1 to achieve a similar operation and an effect.

Further, in the respective embodiments, since the ready queue is set to each of the general-purpose processor groups, the plurality of schedulers SCs executed in the respective general-purpose processor groups can perform the scheduling processings in a higher efficiency in the unit of the processor group.

Also, in the first and second embodiments, since the execution queue is set for each of the processor groups, the tasks can be allocated to the PE of each of the groups in a simple manner. As a result, the load given to the scheduler SC can be reduced, and the overhead in connection with the scheduling processing can be suppressed.

As previously described, in the heterogeneous multiprocessor system in which the heterogeneous PEs are accumulated, due to the arrangement in a divisional manner of the programs for operating the heterogeneous PEs in a high efficiency, and the compiler for producing the control code thereof, the processing can be performed in a high efficiency with low power consumption while the performance of this multiprocessor system can be utilized at maximum. Further, a software developer can form a program within a short time in a higher efficiency without paying attention to the configurations of the processors. As a result, this invention can be applied to LSIs for car navigation systems, portable telephones, and home information appliances, while these LSIs are strongly expected to have higher calculation performance and lower power consumption during processings. As a consequence, various functions for providing, for example, voice information and moving pictures having high qualities, and enabling, for example, image recognition and speech recognition can be realized. Also, this invention may be applied to LSIs for information systems and control systems used in automobiles, so automatic driving operation and safety driving systems can be realized. In addition, this invention may also be applied to future super computers which must have considerably higher calculation performance and must be operated under low power consumption.

What is claimed is:

1. A control method for allocating tasks in a heterogeneous multiprocessor system that includes a plurality of general-purpose processors and one or more accelerators, the one or more accelerators being processors for executing instruction sets that different than instruction sets executed by the general-purpose processors, the control method comprising:

analyzing a depending characteristic of at least one of control and data among a plurality of preset tasks;

extracting executable tasks based on depending relationships among the plurality of tasks;

extracting parallelism of the extracted tasks based on the depending characteristic of at least either one of control and data among the extracted tasks;

allocating the extracted tasks to general-purpose processor groups formed by grouping the plurality of general-purpose processors bused on the extracted parallelism or the extracted tasks;

grouping the one or more accelerators into accelerator groups;

calculating an execution cost for each of the extracted tasks individually;

calculating a priority value for each of the extracted tasks individually based on the execution cost for the extracted task;

determining a task to be reallocated from the extracted tasks based on the priority values calculated for the extracted tasks;

comparing an execution cost of an accelerator group of the one or more accelerator groups executing the determined task with an execution cost of a general-purpose processor group of the general-purpose processor groups executing the determined task;

upon a determination that the execution cost of the accelerator group executing the determined task is lower than the execution cost of the general-purpose processor group executing the determined task, allocating the determined task to the accelerator group; and upon a determination that the execution cost of the general-purpose processor group executing the determined task is lower than the execution cost of the accelerator group executing the determined task, reallocating the determined task to the general-purpose processor group, and wherein comparing the execution cost of the accelerator group executing the determined task with the execution cost of the general-purpose processor group executing the determined task comprises:

calculating a predicted end time instant of a most recent task allocated to the general-purpose processor group and a predicted end time instant of a most recent task allocated to the accelerator group at a present time instant;

calculating a task process time for execution of the determined task by the general-purpose processor group and a task process time for execution of the determined task by the accelerator group;

calculating a data transfer time needed for transferring data tier execution of the determined task by the general-purpose processor group and a data transfer time needed for transferring data for execution of the determined task by the accelerator group; and comparing a value obtained by incorporating the data transfer time into a sum of the task process time and the predicted end time instant of the most recent task for the general-purpose processor group with a value obtained by incorporating the data transfer time into a sum of the task process time and the predicted end time instant of the most recent task for the accelerator group.

2. The control method according to claim 1, wherein:

allocating the extracted tasks to the general-purpose processor groups includes dividing, where a depending relationship among the extracted tasks has parallelism, the plurality of general-purpose processors into a quantity of general-purpose processor groups that corresponds to the parallelism.

3. The control method according to claim 2, wherein:

allocating the extracted tasks to the general-purpose processor groups includes:

setting a first execution queue to any one of the general-purpose processor groups; and setting a second execution queue to each of the one or more accelerator groups; and reallocating the determined task to one of the general-purpose processor group and the accelerator group includes:

populating the determined task to the first execution queue upon a determination that the execution cost of the general-purpose processor group executing the determined task is lower than the execution cost of the accelerator group executing the determined task; and populating the determined task to the second execution queue upon a determination that the execution cost of the accelerator group executing the determined task is lower than the execution cost of the general-purpose processor group executing the determined task.

4. The control method according to claim 2, wherein:

allocating the extracted tasks to the general-purpose processor groups includes:

setting a first execution queue to each of the general-purpose processor groups; and setting a second execution queue to each accelerator group; and reallocating the determined task to one of the general-purpose processor group and the accelerator group includes;

populating the determined task to the first execution queue upon a determination that the execution cost of the general-purpose processor group executing the determined task is lower than the execution cost of the accelerator group executing the determined task; and populating the determined task to the second execution queue upon a determination that the execution cost of the accelerator group executing the determined task is lower than the execution cost of the general-purpose processor group executing the determined task.

5. The control method according to claim 1, wherein:
allocating the extracted tasks to the general-purpose processor groups includes setting a ready queue to each of the general-purpose processor groups; and
determining the task to be reallocated includes:
populating the extracted tasks to the ready queues set for the general-purpose processor groups to which the extracted tasks are allocated;
calculating the priority value for each extracted task populated to the ready queues; and
selecting an extracted task having a highest priority value among the extracted tasks of the ready queues as the task to be reallocated.

6. The control method according to claim 1, wherein reallocating the determined task to one of the general-purpose processor group and the accelerator group includes setting an instruction to transfer data which is necessary for execution of the determined task in the one of the general-purpose processor group and the accelerator group to which the determined task has been reallocated.

7. The control method according to claim 6, wherein:
each of the general-purpose processors and the accelerators included in the multiprocessor system multiprocessor system includes:
a shared memory which is shared by the general-purpose processors and the one or more accelerators; and
a local memory which is occupied by the general-purpose processor or the accelerator that includes the local memory; and
the instruction to transfer data includes an instruction to read data from the shared memory to the local memory before the execution of the task, the data being necessary for the execution of the task in one of the general-purpose processors or accelerators of the general-purpose processor group or accelerator group to which the determined task has been reallocated.

8. The control method according to claim 6, wherein:
each of the general-purpose processors and the accelerators included in the multiprocessor system multiprocessor system includes:
a shared memory which is shared by the general-purpose processors and the one or more accelerators; and
a local memory which is occupied by the general-purpose processor or the accelerator that includes the local memory; and
the instruction to transfer data includes an instruction to write data, which is in the local memory and has been used by the determined task in one of the general-purpose processors or accelerators of the general-purpose processor group or accelerator group to which the determined task has been reallocated, into the shared memory at an end of execution of a last task accessing the data.

9. A data processing system comprising:
at least one processor;
a random access memory for storing data and programs for execution by the at least one processor; and computer readable instructions stored in the random access memory for execution by the at least one processor to implement a multigrain parallelizing compiler for generating an object program for execution in a multiprocessor system that includes a plurality of general-purpose processors and one or more accelerators, the one or more accelerators being processors for executing instruction sets that different than instruction sets executed by the general-purpose processors, the multigrain parallelizing compiler being implemented to perform a method comprising:
reading an input program;
analyzing the input program and dividing the input program into a plurality of grains of tasks;
analyzing a depending characteristic of at least one of control and data among the tasks, and extracting executable tasks based on depending relationships among the plurality of tasks;
extracting parallelism of the extracted tasks based on the depending characteristic of at least either one of control and data among the extracted tasks;
allocating the extracted tasks to general-purpose processor groups formed by grouping the plurality of general-purpose processors based on the extracted parallelism of the extracted tasks;
grouping the one or more accelerators into accelerator groups;
calculating an execution cost for each of the extracted tasks individually;
calculating a priority value for each of the extracted tasks individually based on the execution cost for the extracted task;
determining a task to be reallocated from the extracted tasks based on the priority values calculated for the extracted tasks;
comparing an execution cost of an accelerator group of the one or more accelerator groups executing the determined task with an execution cost of a general-purpose processor group of the general-purpose processor groups executing the determined task;
upon a determination that the execution cost of the accelerator group executing the determined task is lower than the execution cost of the general-purpose processor group executing the determined task, reallocating the determined task to the accelerator group;
upon a determination that the execution cost of the general-purpose processor group executing the determined task is lower than the execution cost of the accelerator group executing the determined task, reallocating the determined task to the general-purpose processor group; and
outputting an object code based on the reallocated task, and
wherein comparing the execution cost of the accelerator group executing the determined task with the execution cost of the general-purpose processor group executing the determined task comprises:
calculating a predicted end time instant of a most recent task allocated to the general-purpose processor group and a predicted end time instant of a most recent task allocated to the accelerator group at a present time instant;
calculating a task process time for execution of the determined task by the general-purpose processor group and a task process time for execution of the determined task by the accelerator group;
calculating a data transfer time needed for transferring data for execution of the determined task by the general-purpose processor group and a data transfer time needed for transferring data for execution of the determined task by the accelerator group; and
comparing a value obtained by incorporating the data transfer time into a sum of the task process time and the predicted end time instant of the most recent task for the general-purpose processor group with a value obtained by incorporating the data transfer time into a sum of the task process time and the predicted end time instant of the most recent task for the accelerator group.

10. The data processing system according to claim 9, wherein:
allocating the extracted tasks to the general-purpose processor groups includes dividing, where a depending relationship among the extracted tasks has parallelism, the plurality of general-purpose processors into a quantity of general-purpose processor groups that corresponds to the parallelism.

11. The data processing system according to claim 9, wherein:
allocating the extracted tasks to the general-purpose processor groups includes setting a ready queue to each of the general-purpose processor groups; and
determining the task to be reallocated includes:
populating the extracted tasks to the ready queues set the general-purpose processor groups to which the extracted tasks are allocated;
calculating the priority value for each extracted task populated to the ready queues; and
selecting an extracted task having a highest priority value among the extracted tasks of the ready queues as the task to be reallocated.

12. The data processing system according to claim 9, wherein:
allocating the extracted tasks to the general-purpose processor groups includes:
setting a first execution queue to any one of the general-purpose processor groups; and
setting a second execution queue to each of the one or more accelerator groups; and
reallocating the determined task to one of the general-purpose processor group and the accelerator group includes:
populating the determined task to the first execution queue upon a determination that the execution cost of the general-purpose processor group executing the determined task is lower than the execution cost of the accelerator group executing the determined task; and
populating the determined task to the second execution queue upon a determination that the execution cost of the accelerator group executing the determined task is lower than the execution cost of the general-purpose processor group executing the determined task.

13. The data processing system according to claim 9, wherein:
allocating the extracted tasks to the general-purpose processor groups includes:
setting a first execution queue to each of the general-purpose processor groups; and
setting a second execution queue to each accelerator group; and
reallocating the determined task to one of the general-purpose processor group and the accelerator group includes:
populating the determined task to the first execution queue upon a determination that the execution cost of the general-purpose processor group executing the determined task is lower than the execution cost of the accelerator group executing the determined task; and
populating the determined task to the second execution queue upon a determination that the execution cost of the accelerator group executing the determined task is lower than the execution cost of the general-purpose processor group executing the determined task.

14. The data processing system according to claim 9, wherein outputting the object code includes inserting a scheduling code between the tasks, and generating an execution code for each of the general-purpose processors or each of the one or more accelerators.

15. The data processing system according to claim 9, wherein outputting the object code includes: generating a scheduling code for the reallocated task; and inserting a scheduling code between the tasks and generating an execution code for each of the general-purpose processors or each of the one or more accelerators as the object code.

16. The data processing system according to claim 9, wherein outputting the object code includes:
generating, in a case where a variable element during execution is not contained in the reallocated task, an execution code for the general-purpose processors or the accelerators to which the reallocated task is reallocated;
generating, in a case where a variable element during execution is contained in the task, a scheduling code for the reallocated task; and generating individual execution codes for the general-purpose processors and the accelerators with the scheduling code incorporated as the object code.

17. The data processing system according to claim 9, wherein reallocating the determined task to one of the general-purpose processor group and the accelerator group includes setting an instruction to transfer data which is necessary for execution of the determined task in the one of the general-purpose processor group and the accelerator group to which the determined task has been reallocated.

18. The data processing system according to claim 17, wherein:
each of the general-purpose processors and the accelerators included in the multiprocessor system multiprocessor system includes:
a shared memory which is shared by the general-purpose processors and the one or more accelerators; and
a local memory which is occupied by the general-purpose processor or the accelerator that includes the local memory; and
the instruction to transfer data includes an instruction to read data from the shared memory to the local memory before the execution of the task, the data being necessary for the execution of the task in one of the general-purpose processors or accelerators of the general-purpose processor group or accelerator group to which the determined task has been reallocated.

19. The data processing system according to claim 17, wherein:
each of the general-purpose processors and the accelerators included in the multiprocessor system multiprocessor system includes:
a shared memory which is shared by the general-purpose processors and the one or more accelerators; and
a local memory which is occupied by the general-purpose processor or the accelerator that includes the local memory; and
the instruction to transfer data includes an instruction to write data, which is in the local memory and has been used by the determined task in one of the general-purpose processors or accelerators of the general-purpose processor group or accelerator group to which the determined task has been reallocated, into the shared memory at an end of execution of a last task accessing the data.

20. A non-transitory computer-usable medium having computer readable instructions stored thereon for execution by a processor to implement a multigrain parallelizing compiler for connecting via a network a plurality of first computers each including a general purpose processor and a plurality of second computers each including an accelerator for executing instruction sets which are different instruction sets for the general-purpose processors, and for generating an object program for execution by the first computers and the second computers, the multigrain parallelizing compiler being executable by the computers to perform a method comprising:

reading an input program;

analyzing the input program and dividing the input program into a plurality of grains of tasks;

analyzing a depending characteristic of at least one of control and data among the tasks, and extracting executable tasks based on depending relationships among the plurality of tasks;

extracting parallelism among the extracted tasks based on the depending characteristic of at least either one of control and data among the extracted tasks;

grouping the plurality of first computers to general-purpose processor groups based on the parallelism;

grouping the second computer to accelerator groups;

calculating an execution cost for each of the extracted tasks individually;

calculating a priority value for each of the extracted tasks individually based on the execution cost for the extracted task;

determining a task to be reallocated from the extracted tasks based on the priority values calculated for the extracted tasks;

comparing an execution cost of an accelerator group of the one or more accelerator groups executing the determined task with an execution cost of a general-purpose processor group of the general-purpose processor groups executing the determined task;

upon a determination that the execution cost of the accelerator group executing the determined task is lower than the execution cost of the general-purpose processor group executing the determined task, reallocating the determined task to the accelerator group;

upon a determination that the execution cost of the general-purpose processor group executing the determined task is lower than the execution cost of the accelerator group executing the determined task, reallocating the determined task to the general-purpose processor group; and outputting an object code based on the reallocated task, and wherein comparing the execution cost of the accelerator group executing the determined task with the execution cost of the general-purpose processor group executing the determined task comprises:

calculating a predicted end time instant of a most recent task allocated to the general-purpose processor group and a predicted end time instant of a most recent task allocated to the accelerator group at a present time instant;

calculating a task process time for execution of the determined task by the general-purpose processor group and a task process time for execution of the determined task by the accelerator group;

calculating a data transfer time needed for transferring data for execution of the determined task by the general-purpose processor group and a data transfer time needed for transferring data for execution of the determined task by the accelerator group; and comparing a value obtained by incorporating the data transfer time into a sum of the task process time and the predicted end time instant of the most recent task for the general-purpose processor group with a value obtained by incorporating the data transfer time into a sum of the task process time and the predicted end time instant of the most recent task for the accelerator group.

* * * * *